(12) United States Patent
Takahashi et al.

(10) Patent No.: US 11,171,479 B2
(45) Date of Patent: Nov. 9, 2021

(54) SUPERCONDUCTING MAGNET DEVICE AND METHOD FOR LIMITING CURRENT DECREASE IN CASE OF ABNORMALITY THEREIN

(71) Applicants: RIKEN, Wako (JP); National Institute for Materials Science, Ibaraki (JP)

(72) Inventors: Masato Takahashi, Wako (JP); Hideaki Maeda, Wako (JP); Kenjiro Hashi, Ibaraki (JP); Gen Nishijima, Ibaraki (JP); Shinji Matsumoto, Ibaraki (JP); Takashi Noguchi, Ibaraki (JP); Tadashi Shimizu, Ibaraki (JP)

(73) Assignees: RIKEN, Saitama (JP); NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 766 days.

(21) Appl. No.: 15/951,263

(22) Filed: Apr. 12, 2018

(65) Prior Publication Data

US 2018/0233899 A1 Aug. 16, 2018

Related U.S. Application Data

(63) Continuation of application No. PCT/JP2016/080182, filed on Oct. 12, 2016.

(30) Foreign Application Priority Data

Oct. 16, 2015 (JP) .............................. JP2015-204497

(51) Int. Cl.
*H02H 9/00* (2006.01)
*H02H 7/00* (2006.01)
(Continued)

(52) U.S. Cl.
CPC ............... *H02H 7/001* (2013.01); *H01F 6/02* (2013.01); *H01F 6/06* (2013.01); *H02H 3/12* (2013.01)

(58) Field of Classification Search
CPC .. H02H 7/001; H02H 3/12; H01F 6/06; H01F 6/02
(Continued)

(56) References Cited

U.S. PATENT DOCUMENTS 5,862,028 A * 1/1999 Kalsi ...................... H02H 7/001
361/19
6,900,714 B1 * 5/2005 Huang ................... H02H 7/001
335/216
(Continued)

FOREIGN PATENT DOCUMENTS

JP 2010-524219 A 7/2010
JP 2014-000346 A 1/2014

OTHER PUBLICATIONS

International Search Report mailed in corresponding International Patent Application No. PCT/JP2016/080182 dated Dec. 13, 2016, consisting of 3 pp. (English Translation Provided).
Written Opinion mailed in corresponding International Patent Application No. PCT/JP2016/080182 dated Dec. 13, 2016, consisting of 4 pp.
(Continued)

*Primary Examiner* — Jared Fureman
*Assistant Examiner* — Lucy M Thomas
(74) *Attorney, Agent, or Firm* — Volpe Koenig

(57) ABSTRACT

A superconducting magnet device including a superconducting coil formed of a high-temperature superconducting wire, a power supply which supplies current to the superconducting coil, and a protector capable of forming a short-circuit path which short-circuits both ends of the superconducting coil to each other is installed. Current is made to flow from the power supply to the superconducting coil in a superconducting state, and the superconducting coil thereby gener-
(Continued)

ates a magnetic field. After the magnetic field is generated, when an abnormality of the superconducting magnet device is detected, or when the power supply and the superconducting coil are disconnected from each other, the short-circuit path is formed by the protector.

15 Claims, 13 Drawing Sheets

(51) Int. Cl.
  *H01F 6/02* (2006.01)
  *H01F 6/06* (2006.01)
  *H02H 3/12* (2006.01)
(58) Field of Classification Search
  USPC .......................................................... 361/19
  See application file for complete search history.

(56) References Cited

U.S. PATENT DOCUMENTS

| | | | |
|---|---|---|---|
| 2005/0286180 A1* | 12/2005 | Huang | H02H 7/001 361/23 |
| 2009/0040664 A1* | 2/2009 | Higuchi | G01R 33/3806 361/19 |
| 2010/0073115 A1 | 3/2010 | Gilgrass | |
| 2012/0071326 A1* | 3/2012 | Wu | H02H 7/001 505/163 |
| 2014/0185165 A1* | 7/2014 | Rajput-Ghoshal | H02H 7/001 361/19 |

OTHER PUBLICATIONS

Office Action issued in corresponding Japanese Patent Application No. 2015-204497 dated Jun. 6, 2019, consisting of 6 pp. (English Translation Provided).

* cited by examiner

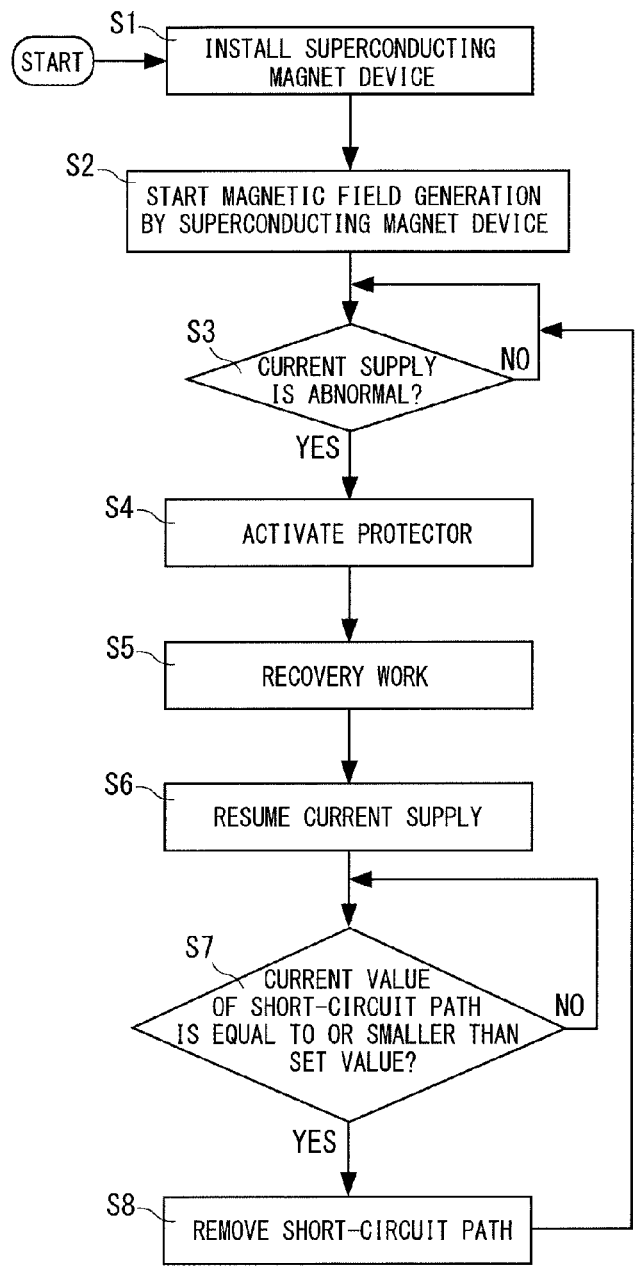

SUPERCONDUCTING MAGNET DEVICE AND METHOD FOR LIMITING CURRENT DECREASE IN CASE OF ABNORMALITY THEREIN

CROSS REFERENCE TO RELATED APPLICATION

This application is a continuation of International Patent Application Serial No. PCT/JP2016/080182, filed Oct. 12, 2016, which claims priority from Japanese patent Application No. 2015-204497 filed on Oct. 16, 2015 which are both incorporated by reference as if fully set forth.

TECHNICAL FIELD

The present invention relates to a superconducting magnet device including a superconducting coil formed of a high-temperature superconducting wire, and a power supply which supplies current to the superconducting coil to generate a magnetic field. Further, the present invention relates to a method for limiting a current decrease in the case of an abnormality in the superconducting magnet device.

BACKGROUND ART

A superconducting magnet device includes a superconducting coil through which high current can flow, and can thereby generate a strong magnetic field. Such a superconducting magnet device can be used as a magnet for nuclear magnetic resonance (NMR), or a magnet for magnetic resonance imaging (MRI). The superconducting magnet device can be used also for any other use (e.g., for a maglev train). Note that "superconducting" may be written as "electrically superconducting,", but is written as "superconducting" in the present patent application.

In the prior art, the superconducting magnet device has been put to practical use, for example, as an NMR magnet using a superconducting coil formed of a low-temperature superconducting wire.

FIG. 1A to FIG. 1C are circuit diagrams of a superconducting magnet device which has been put to practical use. The superconducting magnet device includes a superconducting coil 31 formed of a low-temperature superconducting wire, diodes 33 connected in parallel with the superconducting coil 31, a power supply 35 which supplies current to the superconducting coil 31, a persistent current switch 37, and a heater 39 for warming. The persistent current switch 37 is formed of a low-temperature superconducting wire. This low-temperature superconducting wire 37 functions as a switch in a manner described later, and thus, is represented by the symbol of a switch in FIG. 1A to FIG. 1C. Further, a closed circuit (a circuit indicated by the thick line in FIG. 1C described later), which includes the superconducting coil 31 and the persistent current switch 37 but does not include the diodes 33, is formed of a low-temperature superconducting wire for implementing a persistent current mode. This closed circuit is called a superconducting closed circuit below.

The superconducting magnet device in FIG. 1A to FIG. 1C can generate a magnetic field in the persistent current mode without attenuating the current, by the following procedure.

First, the superconducting coil 31, the diodes 33, and the persistent current switch 37 are arranged in liquid helium inside a cooling container 38. This causes the above-mentioned superconducting closed circuit to be cooled to a transition temperature or lower. The transition temperature is temperature at which a transition occurs from a normal conducting state to a superconducting state (the same applies to the following). Accordingly, the superconducting closed circuit is brought into the superconducting state where the electric resistance becomes zero.

Next, the persistent current switch 37 is warmed by the heater 39 up to temperature higher than the above-mentioned transition temperature. This causes the state of the persistent current switch 37 (superconducting wire) to change to the normal conducting state where the loop of the superconducting closed circuit is cut. In other words, the persistent current switch 37 is turned off (the state of FIG. 1A).

Then, when current flows from the power supply 35 to the superconducting coil 31, the current flows through a path indicated by the thick line in FIG. 1B. At this time, since the persistent current switch 37 is in the normal conducting state, almost no current flows through the persistent current switch 37.

In this state, the current from the power supply 35 is increased. When this current value is increased up to a rated current value, warming by the heater 39 is stopped. Thus, the persistent current switch 37 (superconducting wire) is cooled again by the liquid helium, and brought into the superconducting state.

After that, the current from the power supply 35 is decreased so that the current flowing through the persistent current switch 37 is increased. Then, when the current from the power supply 35 becomes zero, a value of current following from the persistent current switch 37 to the superconducting coil 31 becomes the rated current value described above. This current is circulated in the above-mentioned superconducting closed circuit without being attenuated. In other words, as in FIG. 1C, the current flows through the path indicated by the thick line in this figure. At this time, the superconducting magnet device is in the persistent current mode where the superconducting coil 31 is generating a magnetic field without the power supply.

The superconducting magnet device which generates a magnetic field in the persistent current mode as described above is described in Patent Literature 1 mentioned below, for example.

CITATION LIST

Patent Literature

PTL 1: Japanese Patent Application Laid-Open No. 2014-346

SUMMARY OF INVENTION

Technical Problem (Advantages of High-Temperature Superconducting Wire)

Although the low-temperature superconducting wire is used in the superconducting magnet device of FIG. 1A to FIG. 1C, it is desired to implement a superconducting magnet device using a high-temperature superconducting wire. This is because the high-temperature superconducting wire mainly has the two following advantages. First, the transition temperature of the high-temperature superconducting wire is equal to or higher than the boiling point (77K) of liquid nitrogen, for example, and is higher than the transition temperature of the low-temperature superconducting wire. Secondly, high current can flow through the high-temperature superconducting wire even in a high magnetic field.

Thus, a superconducting coil formed of a high-temperature superconducting wire can be brought into the superconducting state by using, for example, liquid nitrogen or a small refrigerator without using liquid helium. Further, even in a high magnetic field (even when the magnetic field generated from the surroundings is high), the superconducting coil of the high-temperature superconducting wire can produce a strong magnetic field by the flow of high current through the superconducting coil of the high-temperature superconducting wire. Further, according to the superconducting magnet device including the superconducting coil of the high-temperature superconducting wire, the same strong magnetic field can be generated by a configuration smaller than in the case of using the low-temperature superconducting wire.

(Configuration of Device Using High-Temperature Superconducting Wire)

However, the superconducting magnet device using the high-temperature superconducting wire cannot generate a magnetic field in the persistent current mode. This is because connection between high-temperature superconducting wires, or connection between the high-temperature superconducting wire and the low-temperature superconducting wire cannot be made at an electric resistance of zero. In other words, although the electric resistance of the superconducting closed circuit in FIG. 1C is zero, the closed circuit with the electric resistance of zero cannot be implement when the high-temperature superconducting wire is used.

Therefore, a configuration in FIG. 2 without using the persistent current switch is considered as a configuration of a superconducting magnet device using a high-temperature superconducting wire.

In FIG. 2, the superconducting magnet device includes a superconducting coil 41 formed of a high-temperature superconducting wire, diodes 43 connected in parallel with the superconducting coil 41, and a power supply 45 which supplies current to the superconducting coil 41. A circuit part including the superconducting coil 41 and the diodes 43 is cooled to a transition temperature of the high-temperature superconducting wire or lower by using, for example, a refrigerant (i.e., liquid nitrogen, liquid hydrogen, liquid argon, liquid helium, or any other cryogenic refrigerant) in the cooling container 47, or a small refrigerator.

(Magnetic Field Generation Method for Device Using High-Temperature Superconducting Wire)

In the case of FIG. 2, it is considered to generate a magnetic field in the superconducting magnet device by the following procedure.

First, the superconducting coil 41 and the diodes 43 are cooled to a temperature equal to or lower than the transition temperature of the high-temperature superconducting wire, by using the refrigerant or the small refrigerator as described above.

Next, the current from the power supply 45 is increased to a high current of 50 A to 2000 A, for example.

Then, the state of connection between the power supply 45 and the superconducting coil 41 is maintained so that the current flowing through the superconducting coil 41 is kept constant. The reason for maintaining the connection of the power supply 45 is that the superconducting closed circuit with the electric resistance of zero cannot be implemented when the high-temperature superconducting wire is used.

(Problems in Device Using High-Temperature Superconducting Wire)

In the case of FIG. 2, it is supposed that the power supply 45 and the superconducting coil 41 are disconnected from each other when an abnormality occurs as in the following cases (1) to (3), for example, (1) When a power failure or a momentary drop (instantaneous voltage drop) occurs, the supply of current from the power supply 45 is stopped, resulting in a state where the power supply 45 is disconnected from the superconducting coil 41.

(2) When a sensor detects a failure such as an event that a value of current supplied from the power supply 45 becomes larger or smaller than an allowable range or an event that a flow of cooling water for cooling the power supply 45 is stopped, a switch (not illustrated) which connects the power supply 45 to the superconducting coil 41 is turned off to disconnect both thereof from each other.

(3) For any other reasons (e.g., for making maintenance), the switch which connects the power supply 45 to the superconducting coil 41 is turned off to disconnect both thereof from each other.

In such cases, current flows through the closed circuit including the diodes 43 and the superconducting coil 41 so that the current in the superconducting coil 41 is prevented from becoming zero instantaneously. However, due to heat generation of the diodes 43, the current is decreased to zero rapidly, even if it is not decreased instantaneously. In this case, even though a discharge breakdown of the superconducting coil 41 is prevented by the diodes 43, at least one of the following problems (A), (B), and (C) (e.g., all the problems) arises.

(A) The magnetic field by the superconducting magnet device cannot be continuously used. For example, when the superconducting magnet device is used for traveling of a maglev train, the maglev train cannot continue to travel.

(B) For recovery, it takes more than half a day (e.g., time from about one day to a month) to increase a value of current flowing through the superconducting coil 41, from zero to a target high-current value. This is because an inductance of the superconducting coil 41 is large (e.g., 10 H to 2000 H, and preferably 50 H to 1000 H), and thus, a current value is increased gradually such that heat is not generated.

(C) There is a possibility that thermal runaway occurs due to a hysteresis loss of the high-temperature superconducting coil 41 as described below.

Most of high-temperature superconducting wires are tape-like wire materials due to material properties and for the convenience of a manufacture method. An aspect ratio (a ratio of the longer side to the shorter side) of the cross-section of a typical tape-like high-temperature superconducting wire is a value ranging from 5 to 10 or more. Further, the tape-like high-temperature superconducting wire has a feature that a high-temperature superconducting part exists on the tape surface thinly and widely. Thus, eddy current (shielding current) which flows so as to shield a varying magnetic field perpendicular to the tape surface tends to occur.

In a low-temperature superconducting wire, the superconducting part is formed into multi-filaments to prevent this. However, in the cases of high-temperature superconducting wires including the case of wire materials other than the tape-like ones, it is difficult to form the superconducting part into multi-filaments, or it is unable to form the superconducting part into multi-filaments at the level same as that in the case of the low-temperature superconducting wire. When the superconducting part is not formed into multi-filaments, or when an amount of multi-filaments is small, the shielding current in a varying magnetic field causes a hysteresis loss. Therefore, the hysteresis loss is large in the high-temperature superconducting coil 41 compared with the low-temperature superconducting coil, and thus, heat is generated in the high-temperature superconducting coil 41 due to the large hysteresis loss during magnetization and demagnetization of the magnet (during an increase or decrease of magnet current).

In a location where the hysteresis loss is particularly large in the superconducting coil 41, a temperature of a part of the superconducting coil 41 increases locally in the location due to heat generation by the hysteresis loss, and in some cases, exceeds a critical temperature.

Since current is applied, a critical temperature at this time is significantly lower than a critical temperature when no magnetic field exists, i.e., when no current is applied.

Therefore, superconduction is shifted to normal conduction by even a slight rise in temperature.

This generates electric resistance inside the superconducting wire, and generates further local heat due to the electric resistance. This leads to a negative cycle of a further local rise in temperature. This is called local thermal runaway.

Since the stored energy of the superconducting coil 41 becomes heat only in a location where the local thermal runaway occurs, fatal damage such as the disconnection or burnout of the superconducting coil 41 is cased in the superconducting coil 41 due to the rise in temperature.

In order to prevent the local thermal runaway, it is common practice to slow down a rate of change in current during magnetization and demagnetization. In this case, an amount of local heat due to a hysteresis loss has only to fall below the cooling capacity in the location.

However, the inventors of the present patent application have found that a rate at which a protection circuit constituted by the diodes 43 decreases the current is very high, and there is a possibility that local thermal runaway occurs due to a hysteresis loss specific to the high-temperature superconducting coil 41 when only the protection circuit of the diodes 43 is used.

From the above-described study, the inventors of the present patent application have found out a problem that it is desirable to limit a decrease in current flowing through the superconducting coil when the power supply is disconnected from the superconducting coil due to an abnormal state or for any other reason (for example, maintenance of the power supply) in the superconducting magnet device using the superconducting coil formed of the high-temperature superconducting wire. In other words, the inventors of the present patent application have found that when the power supply is disconnected from the superconducting coil, the above-described problems (A), (B), and (C) can be solved if a decrease in value of current flowing through the superconducting coil can be limited.

It is an object of the present invention to provide a method and device capable of limiting a decrease in current flowing through a superconducting coil when a power supply and the superconducting coil are disconnected from each other for the reason that an abnormal state is detected in a superconducting magnet device or for any other reason (for example, maintenance of the power supply).

Solution to Problem

In order to accomplish the above-described object, according to the present invention, there is provided a method for limiting a current decrease in a superconducting magnet device, including:

(A) installing the superconducting magnet device including a superconducting coil formed of a high-temperature superconducting wire, a power supply which supplies current to the superconducting coil, and a protector capable of forming a short-circuit path which short-circuits both ends of the superconducting coil to each other;

(B) making current flow from the power supply to the superconducting coil in a superconducting state, and thereby causing the superconducting coil to generate a magnetic field; and (C) after the magnetic field is generated by the (B), when an abnormality of the superconducting magnet device is detected, or when the power supply and the superconducting coil are disconnected from each other, forming the short-circuit path by the protector.

According to this method, when an abnormality of the superconducting magnet device is detected or when the power supply and the superconducting coil are disconnected from each other after the current flows from the power supply to the superconducting coil in the superconducting state to generate the magnetic field by the superconducting coil, the short-circuit path is formed by the protector. As a result, a closed circuit including the superconducting coil and the short-circuit path is formed. Therefore, the current flowing through the superconducting coil is circulated through this closed circuit. Since electric resistance of this closed circuit is very small, a decrease in current circulated through the closed circuit can be limited.

Thus, even when current is no longer supplied from the power supply to the superconducting coil, the superconducting coil can continue to generate a magnetic field for a certain period of time (e.g., six hours to a few days).

Further, when the power supply is recovered in a relatively long period of time (e.g., six hours to a few days) after the current supply from the power supply is stopped, a value of current flowing through the above-described closed circuit at the time of completion of the recovery remains sufficiently large. Therefore, when the current supply from the power supply is resumed after the completion of the recovery, it is unnecessary to increase the current flowing through the superconducting coil gradually from zero. For this reason, the time required to increase the current value gradually to a target value is shortened. For example, even when the above-described abnormal state occurs at midnight and recovery work is completed before the noon of the same day, the current value can be increased to the target value in a short period of time.

The method preferably includes:

(D) after the power supply and the superconducting coil are disconnected from each other, making current flow again to the superconducting coil from the power supply or from a new power supply as a substitute for the power supply, in a state where current is circulating through the short-circuit path and the superconducting coil; and (E) increasing current flowing from the power supply to the superconducting coil in the (D), and removing the short-circuit path when it is detected that magnitude of current flowing through the short-circuit path becomes equal to or smaller than a set value.

Thus, for example, after the abnormal state is taken away, the current supply from the power supply to the superconducting coil is started. Then when it is detected that the magnitude of current flowing through the short-circuit path becomes equal to or smaller than the set value, the short-circuit path is removed and returned to the original state. Thus, a fluctuation in current value of the superconducting coil due to the current of the short-circuit path can be prevented when returning to the original state.

(i) In order to accomplish the above-described object, according to the present invention, there is provided a superconducting magnet device including:

a superconducting coil which is formed of a high-temperature superconducting wire and which generates a magnetic field when current is suppled thereto from a power supply;

a power supply which supplies current to the superconducting coil in a superconducting state, and thereby causes the superconducting coil to generate a magnetic field; and a protector capable of forming a short-circuit path which short-circuits both ends of the superconducting coil to each other.

(ii) Further, in order to accomplish the above-described object, according to the present invention, there is provided a there is provided a superconducting magnet device including:

a superconducting coil which is formed of a high-temperature superconducting wire and which generates a magnetic field when current is suppled thereto from a power supply; and a protector capable of forming a short-circuit path which short-circuits both ends of the superconducting coil to each other, wherein a power supply supplies current to the superconducting coil in a superconducting state, and thereby causes the superconducting coil to generate a magnetic field. In other words, the superconducting magnet device does not need to include the power supply as a constituent element.

According to such a device, when the abnormality of the superconducting magnet device is detected, or when the power supply and the superconducting coil are disconnected from each other, the short-circuit path can be formed by the protector. As a result, a closed circuit including the superconducting coil and the short-circuit path is formed. Therefore, the current flowing through the superconducting coil is circulated through this closed circuit. Since the electric resistance of this closed circuit is very small, a decrease in current circulated through the closed circuit can be limited.

Further, this superconducting magnet device can also limit the number of times of using the power supply, depending on its use mode (e.g., the modification 8 described later) while making effective use of a protection function of the protector to limit a current decrease in the case of an abnormality. In this case, a current decrease can be limited or small even when the power supply is not connected to the superconducting coil.

For example, the above-described superconducting magnet device can be configured as follows.

(iii) The superconducting magnet device according to (i) or (ii) described above includes:

a detector which outputs a short-circuit signal when detecting that the superconducting magnet device becomes in an abnormal state; and an activation device which activates the protector so as to form the short-circuit path when the short-circuit signal is output.

According to this configuration, a closed circuit including the superconducting coil and the short-circuit path can be formed automatically when the power supply is disconnected from the superconducting coil due to the abnormality.

(iv) The superconducting magnet device according to (iii) described above is configured such that the protector includes a switch, and the short-circuit path is formed by closing the switch.

According to this configuration, a current decrease can be limited as described above, with a simple configuration using the switch.

(v) The superconducting magnet device according to any one of (i) to (iv) described above is configured such that the power supply is a constant current source which supplies constant current to the superconducting coil, and the constant current flows through the superconducting coil in a direction from one end to the other end of the superconducting coil, and the superconducting magnet device includes a pair of anti-parallel-connected diodes (i.e., reverse and forward diodes) connected in parallel and anti-parallel with the superconducting coil.

There is the following possibility when no reverse diode is provided. For example, when the power supply and the superconducting coil are disconnected from each other due to the abnormal state described above, the current of the superconducting coil can flow to nowhere before the protector is activated. However, the superconducting coil continues to cause current to flow so that a voltage ($Vc=-LdI/dt$) between both ends of the superconducting coil becomes high (e.g., 1000 V), enabling the current to flow. As a result, an electrical discharge occurs to convert all stored magnetic field energy into thermal energy, so that the superconducting coil is burnt out.

Meanwhile, when the reverse diode is provided, this problem is solved as follows. For example, when the power supply and the superconducting coil are disconnected from each other due to the abnormal state described above, the current of the superconducting coil can flow to nowhere for a minute time until the protector is activated. However, the superconducting coil continues to cause current to flow so that a voltage ($Vc=-LdI/dt$) between both ends of the superconducting coil becomes high. When this voltage becomes higher than a forward voltage of the reverse diode, a large amount of current passes through the reverse diode and circulates through the reverse diode and the superconducting coil. For this reason, it is possible to prevent the current of the superconducting coil from disappearing instantaneously. Accordingly, the superconducting coil can be prevented from being burnt out. Although heat is generated in the reverse diode at this time, the protector forms the short-circuit path immediately, the current path of the superconducting coil is switched from the path of the reverse diode to the short-circuit path. This can limit an amount of heat generation in the reverse diode to a very small amount.

(vi) The superconducting magnet device according to (iii) described above is configured such that the detector includes:

a supply current detecting unit which detects magnitude of current supplied from the power supply to the superconducting coil;

a supply current comparing unit which determines whether or not the magnitude of the current detected by the supply current detecting unit satisfies a set condition; and a short-circuit signal outputting unit which outputs the short-circuit signal for occurrence of an abnormal state, when the supply current comparing unit determines that the magnitude of current does not satisfy the set condition.

According to this configuration, when the supply current comparing unit determines that the detected current value does not satisfy the set condition, the short-circuit signal outputting unit outputs the short-circuit signal so that the short-circuit path is formed. In this case, when the abnormal state (e.g., a malfunction of the power supply) occurs, a detected current value described above does not satisfy the set condition, and accordingly, the above-described short-circuit path is formed.

(vii) The superconducting magnet device according to (iii) described above is configured such that the detector includes:

a voltage detection unit which detects magnitude of a voltage between two points of a current path that connects the power supply and the superconducting coil;

a voltage comparison unit which determines whether or not the magnitude of the voltage detected by the voltage detection unit satisfies a set condition; and a short-circuit signal outputting unit which outputs the short-circuit signal for occurrence of an abnormal state, when the voltage comparison unit determines that the magnitude of the voltage does not satisfy the set condition.

According to this configuration, when the abnormal state (e.g., a malfunction of the power supply) occurs, the magnitude of the voltage detected by the voltage detection unit does not satisfy the set condition, and accordingly, the above-described short-circuit path is formed.

(viii) The superconducting magnet device according to (iii) is configured such that the detector includes:

a power abnormality detecting unit which detects an abnormality of the power supply; and a short-circuit signal outputting unit which outputs the short-circuit signal for occurrence of an abnormal state, when the power abnormality detecting unit detects an abnormality of the power supply.

According to this configuration, when the power abnormality detecting unit detects the abnormality of the power supply, the short-circuit signal outputting unit outputs the short-circuit signal. Thus, the above-described short-circuit path is formed.

(ix) The superconducting magnet device according to (iii) incudes:

a short-circuit current detecting unit which detects magnitude of current flowing through the short-circuit path formed by the protector;

a short-circuit current comparing unit which determines whether or not the magnitude of the current detected by the short-circuit current detecting unit is equal to or smaller than a set value; and a removal signal output unit which outputs, to the activation device of the protector, a short-circuit removal signal for removing the short-circuit path when a determination result of the short-circuit current comparing unit is affirmative, and when receiving the short-circuit removal signal, or when receiving both of the short-circuit removal signal and a short-circuit removal command, the activation device removes the short-circuit path formed by the protector.

According to this configuration, for example, in the case where after the abnormal state is taken away, the supply of current from the power supply to the superconducting coil is resumed with the current being circulating through the short-circuit path and the superconducting coil, when magnitude of current flowing through the short-circuit path becomes equal to or smaller than the set value, the short-circuit removal signal is output. This causes the activation device to remove the above-described short-circuit path. Thus, a current value of the superconducting coil can be prevented from fluctuating due to the current in the short-circuit path when returning to the original state.

(x) The superconducting magnet device according to (iv) includes a plurality of magnetic field generators each including the superconducting coil and the protector, and the power supply is shared by the plurality of magnetic field generators, and the superconducting magnet device comprises:

a coil state detecting unit which is provided in each of the magnetic field generators and which detects magnitude of current flowing through the superconducting coil or magnitude of a magnetic field generated by the superconducting coil;

a current supply switch which is provided in each of the magnetic field generators and which is driven between a closed position at which current is supplied from the power supply to the magnetic field generator and an open position at which the magnetic field generator is disconnected from the power supply; and a control unit which causes the current supply switch in each of the magnetic field generators to be driven to the closed position when the magnitude detected by the coil state detecting unit becomes equal to or smaller than a reference value, in a state where the switch of the protector is closed in the magnetic field generator.

In this superconducting magnet device, since one power supply is provided for plural superconducting coils to supply current from the power supply to the superconducting coil when the current of the superconducting coil becomes equal to or smaller than the reference value, the number of times of using the power supply and the number of used power supplies can be reduced. Even in this case, the protection function of the protector for limiting a current decrease in the case of the abnormality can be used (e.g., the modification 7 described later).

Further, even while the power supply is not connected to the superconducting coil, a current decrease can be limited or small.

Advantageous Effects of Invention

According to the present invention described above, while current is flowing from the power supply to the superconducting coil in the superconducting state to generate a magnetic field by the superconducting coil, when an abnormality of the superconducting magnet device is detected or when the power supply and the superconducting coil are disconnected from each other, a short-circuit path is formed by the protector. This forms a closed circuit including the superconducting coil and the short-circuit path. Therefore, the current flowing through the superconducting coil is circulated through this closed circuit. Since electric resistance of this closed circuit is very small, a decrease in current circulated through the closed circuit can be limited.

BRIEF DESCRIPTION OF DRAWINGS

FIG. 4 is a flowchart illustrating a method for limiting a current decrease according to an embodiment of the present invention.

DESCRIPTION OF EMBODIMENTS

Figure 1A:
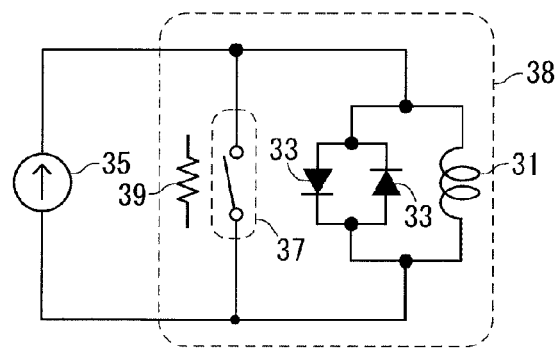
FIG. 1A is a circuit diagram of a superconducting magnet device using a low-temperature superconducting wire.

A preferred embodiment of the present invention is described based on the accompanying drawings. Note that parts common to those in respective drawings are designated by the same reference numerals, and the overlapping description is omitted.

Figure 3A:
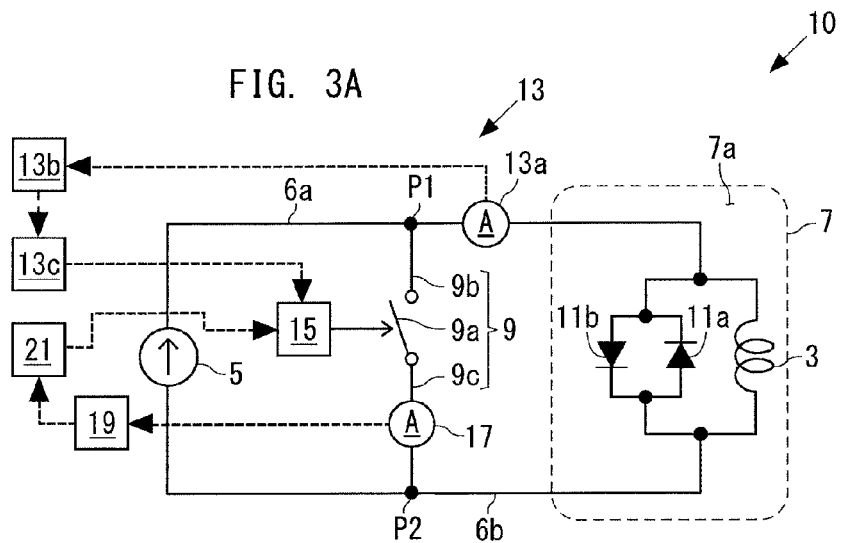
FIG. 3A is a circuit diagram of a superconducting magnet device according to an embodiment of the present invention.

FIG. 3A is a circuit diagram illustrating a superconducting magnet device 10 according to an embodiment of the present invention. The superconducting magnet device 10 may be a device for generating a magnetic field (e.g., a static magnetic field), as a magnet for NMR or a magnet for MRI. Instead, the superconducting magnet device 10 may be a device for generating a magnetic field (e.g., a static magnetic field) in another device (e.g., a maglev train or a particle accelerator).

The superconducting magnet device 10 includes a superconducting coil 3, a power supply 5, a cooling container 7, a protector 9, a reverse diode 11a, a forward diode 11b, a detector 13, an activation device 15, a short-circuit current detecting unit 17, and a short-circuit current comparing unit 19.

The superconducting coil 3 is provided to generate a magnetic field. The superconducting coil 3 is formed of a high-temperature superconducting wire. This high-temperature superconducting wire is a tape-like wire material, for example. An aspect ratio (a ratio of the longer side to the shorter side) of the cross-section of this tape-like high-temperature superconducting wire (i.e., the tape-like super- conducting coil 3) is a value ranging from 5 to 10 or more, for example. When the superconducting coil 3 is cooled to a transition temperature or lower, the superconducting coil 3 is brought into a superconducting state where a value of electric resistance is zero.

In the present specification, the term "high-temperature superconducting wire" is typically a wire material made of a superconductor substance having a critical temperature Tc (transition temperature) equal to or higher than about 25 K in the absence of magnetic field. Wire materials made of a superconductor substance such as a copper-based oxide superconductor or an iron-based superconductor are all high-temperature superconducting wires. Examples of the high-temperature superconducting wire include a wire material made of an yttrium-based superconductor or a bismuth-based superconductor. Examples of the high-temperature superconducting wire further includes a wire material expressed by a chemical formula of $YBa_2Cu_3O_{7-\delta}$ a wire material made of $ReBa_2Cu_3O_{7-\delta}$ where the element Y in the preceding chemical formula is replaced with Re indicative of a rare earth element, and a wire material made of $Bi_2Sr_2Ca_{n-1}Cu_nO_{4+2n+\delta}$ including $Bi_2Sr_2CaCu_2O_{8+\delta}$ (Bi2212) and $Bi_2Sr_2Ca_2Cu_3O_{10+\delta}$ (Bi2223). Further, examples of the high-temperature superconducting wire include the above-mentioned wire materials on which oxide nanoparticles such as zirconium or dysprosium have been precipitated to improve the critical current characteristics, and the above-mentioned wire materials whose part has been replaced with another element. Examples of the high-temperature superconducting wire include even a wire material made of a metal-based superconductor, such as $MgB_2$, made of a substance whose superconducting transition temperature exceeds 25 K.

In the present embodiment, the transition temperature of the high-temperature superconducting wire is higher than the transition temperature of a low-temperature superconducting wire. For example, the transition temperature of the high-temperature superconducting wire may be a value (e.g., a value equal to or higher than a boiling point of 77K of liquid nitrogen) within a range of no less than 25K and no more than 153K. However, when a high-temperature superconducting wire having a transition temperature higher than this range is discovered, the superconducting coil 3 can be formed of such a high-temperature superconducting wire.

Note that the "superconducting coil formed of the high-temperature superconducting wire" in the present specification and the claims means a coil at least part (part or all) of which is made of the high-temperature superconducting wire.

The power supply 5 supplies current to the superconducting coil 3 to generate a magnetic field in the superconducting coil 3. Preferably, the power supply 5 is a constant current source which supplies constant current to the superconducting coil 3. A value of current supplied from the power supply 5 to the superconducting coil 3 is within a range of no less than 10 A and no more than 10000 A, and is preferably a value in a range of no less than 50 A and no more than 2000 A. A positive electrode of the power supply 5 and one end of the superconducting coil 3 are connected through a first current path 6a formed of a conductive material. A negative electrode of the power supply 5 and the other end of the superconducting coil 3 are connected through a second current path 6b formed of a conductive material. Note that the power supply 5 may be manufactured and sold separately from a superconducting magnet device 10 excluding the power supply 5, and may be connected to the superconducting coil 3 at the time of installation of such a superconducting magnet device 10.

The cooling container 7 includes an internal space 7a cooled to be equal to or lower than the transition temperature of the high-temperature superconducting wire that forms the superconducting coil 3. The superconducting coil 3 is placed in this internal space 7a. For example, the cooling container 7 has a configuration in FIG. 3B, FIG. 3C, or FIG. 3D.

Figure 3B:
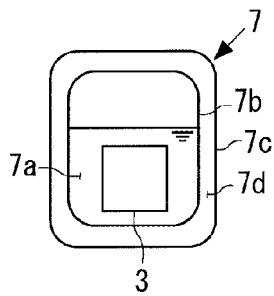
FIG. 3B illustrates a configuration example of a cooling container.

In the case of FIG. 3B, the cooling container 7 includes an inner container 7b and an outer container 7c as a double-shell structure. The inner container 7b includes the internal space 7a described above, and a liquid refrigerant (i.e., liquid nitrogen, liquid hydrogen, liquid argon, liquid helium, or any other cryogenic refrigerant) is stored in the internal space 7a. The superconducting coil 3 is placed in this refrigerant. A vacuum layer 7d as a vacuum is formed between the inner container 7b and the outer container 7c. In the case of FIG. 3B, the internal space 7a is replenished with the liquid refrigerant, periodically (e.g., once every three months), and no problems arise in the cooling container 7 even when a power failure occurs.

Figure 3C:
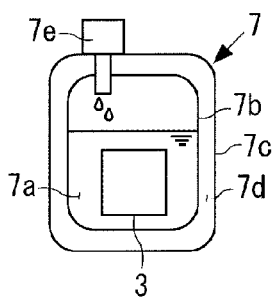
FIG. 3C illustrates another configuration example of the cooling container.

In the case of FIG. 3C, the cooling container 7 has the same configuration as that in the case of FIG. 3B except that a refrigerator 7e is attached to the cooling container 7. The refrigerator 7e recondenses the refrigerant in the internal space 7a. In the case of FIG. 3C, since the refrigerator 7e is present, there is no need to periodically replenish the internal space 7a with the liquid refrigerant. However, when a power failure occurs, the internal space 7a is replenished with the liquid refrigerant before the internal space 7a runs out of the refrigerant (e.g., within seven days), or power is supplied to the refrigerator 7e to resume the operation of the refrigerator 7e.

Figure 3D:
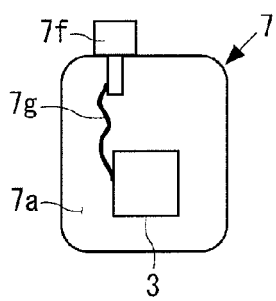
FIG. 3D illustrates still another configuration example of the cooling container.

In the case of FIG. 3D, a refrigerator 7f is attached to the cooling container 7. The refrigerator 7f and the superconducting coil 3 are thermally connected through a thermal conductor 7g (a metal plate or a braided wire).

Note that the cooling container 7 may be manufactured and sold separately from a superconducting magnet device 10 excluding the cooling container 7, and used in conjunction with such a superconducting magnet device 10.

The protector 9 can form a short-circuit path for short-circuiting both ends of the superconducting coil 3 to each other. In the present embodiment, the term "short-circuit" in the short-circuit path may mean that a current decrease rate dI/dt is less than that in the case of the reverse diode 11a. In other words, when the same value of current flows through both the short-circuit path and the reverse diode 11a, respectively, an amount of heat generation due to electric resistance of the short-circuit path (i.e., an amount of current decrease due to this electric resistance) is smaller than an amount of heat generation in the reverse diode 11a (i.e., an amount of current decrease due to this heat generation).

When the electric resistance of the short-circuit path formed by the protector 9 is not zero, it is easy to measure (detect) a value of current flowing through this short-circuit path.

In the present embodiment, the protector 9 includes a switch 9a. One end of the switch 9a is connected to one end of the superconducting coil 3, and the other end of the switch 9a is connected to the other end of the superconducting coil 3. When the switch 9a is closed, both ends of the superconducting coil 3 are short-circuited to each other through the switch 9a. In FIG. 3A, the protector 9 includes a first conductive path 9b and a second conductive path 9c. The first conductive path 9b connects one end of the switch 9a and a halfway point P1 of the first current path 6a, and the second conductive path 9c connects the other end of the switch 9a and a halfway point P2 of the second current path 6b.

In FIG. 3A, this protector 9 is provided outside the cooling container 7, but the protector 9 may be provided in the internal space 7a of the cooling container 7 together with the short-circuit current detecting unit 17, or the elements of the protector 9 may be provided outside and inside the cooling container 7 in a distributed manner. Further, the protector 9 is provided outside the power supply 5 in FIG. 3A, but the protector 9 may be provided inside the power supply 5 (and outside the cooling container 7), or the elements of the protector 9 may be provided outside and inside the power supply 5 in a distributed manner.

A pair of the anti-parallel-connected diodes 11a and 11b are connected in parallel and anti-parallel with the superconducting coil 3. The reverse diode 11a is connected in anti-parallel with the superconducting coil 3. In other words, a cathode of the reverse diode 11a is connected to one end of the superconducting coil 3 (a positive electrode of the constant current source 5), and an anode of the reverse diode 11a is connected to the other end of the superconducting coil 3 (a negative electrode of the constant current source 5). Meanwhile, an anode of the forward diode 11b is connected to the one end of the superconducting coil 3 (a positive electrode of the constant current source 5), and a cathode of the forward diode 11b is connected to the other end of the superconducting coil 3 (a negative electrode of the constant current source 5). Note that the forward diode 11b may be omitted.

When detecting an abnormal state of the superconducting magnet device 10 (for example, detecting that the supply of current from the power supply 5 to the superconducting coil 3 is in an abnormal state), the detector 13 outputs a short-circuit signal to the activation device 15. Hereinafter, such an abnormal state is simply called the abnormal state.

In FIG. 3A, this detector 13 is provided outside the cooling container 7, but the detector 13 may be provided in the internal space 7a of the cooling container 7, or the elements of the detector 13 may be provided outside and inside the cooling container 7 in a distributed manner.

In the present embodiment, the detector 13 includes a supply current detecting unit 13a, a supply current comparing unit 13b, and a short-circuit signal outputting unit 13c.

The supply current detecting unit 13a detects magnitude (i.e., an absolute value) of current supplied from the power supply 5 to the superconducting coil 3. The supply current detecting unit 13a may be an ammeter. In FIG. 3A, the ammeter 13a is provided at the first current path 6a, but the ammeter 13a may be provided at the second current path 6b. Note that any of various configurations and arrangements can be adopted as the configuration and arrangement of the supply current detecting unit 13a as long as the supply current detecting unit 13a can detect magnitude of current supplied from the power supply 5 to the superconducting coil 3. For example, the supply current detecting unit 13a may measure a voltage between both ends of the superconducting coil 3 or measure a voltage between both ends of a resistor that is provided in the first current path 6a or the second current path 6b and that has a known electric resistance value, and then, may detect magnitude of current supplied from the power supply 5 to the superconducting coil 3, based on the measured value, the. Instead, by using a DCCT or a hall element, an NMR phenomenon, or the like for example, the supply current detecting unit 13a may measure a value (strength) of a magnetic field generated by the current flowing through the superconducting coil 3 or any other part (e.g., the first current path 6a or the second current path 6b), and may detect magnitude of current supplied from the power supply 5 to the superconducting coil 3, based on the measured value of the magnetic field.

The supply current comparing unit 13b determines whether or not the magnitude of current detected by the supply current detecting unit 13a no longer meets a set condition. This set condition is a condition that the magnitude of current detected by the supply current detecting unit 13a is larger than a threshold value, or a condition that the magnitude of this current falls within a set range. The threshold value may be zero, a value (e.g., a value ranging from 0.1 A to 10 A) close to zero, or a predetermined percentage (e.g., a percentage of 10% or less) of the magnitude of current detected by the supply current detecting unit 13a at normal time. The set range may be a range of current magnitudes detected by the supply current detecting unit 13a at normal time, or a range close to this range.

When the supply current comparing unit 13b determines that the current value detected by the supply current detecting unit 13a does not meet the above set condition (i.e., when the detected current value is equal to or smaller than the threshold value, or the detected current value is smaller or larger than those in the set range), the short-circuit signal outputting unit 13c determines that the abnormal state occurs, and thus, outputs a short-circuit signal to the activation device 15.

In response to receiving the short-circuit signal, the activation device 15 activates the protector 9 to form a short-circuit path. In the present embodiment, the activation of the protector 9 is operation to close the switch 9a. In other words, the activation device 15 closes the switch 9a to form the short-circuit path. The activation device 15 closes the switch 9a mechanically (by mechanical power) or magnetically (by an electromagnetic force). Instead, the activation device 15 may be configured so as to close the switch 9a by using gravity.

The short-circuit current detecting unit 17 detects magnitude of current flowing through the short-circuit path formed by the protector 9. Note that any of various configurations and arrangements can be adopted as the configuration and arrangement of the short-circuit current detecting unit 17 as long as the short-circuit current detecting unit 17 can detect magnitude of current flowing through the short-circuit path. For example, the short-circuit current detecting unit 17 may be provided at the second conductive path 9c as illustrated in FIG. 3A, or provided at the first conductive path 9b. In another example, the short-circuit current detecting unit 17 may measure a voltage between the first conductive path 9b and the second conductive path 9c to detect the magnitude of current, based on the measured value and a known electric resistance value between the first conductive path 9b and the second conductive path 9c. In still another example, the short-circuit current detecting unit 17 may detect magnitude of current flowing through the short-circuit path, based on a difference between current values in two parts other than the protector 9 (the first conductive path 9b and the second conductive path 9c). For example, these two parts may be one part of the first current path 6a on the upstream side of the halfway point P1 and one part of the first current path 6a on the downstream side of the halfway point P1. Note that the short-circuit current detecting unit 17 may detect the current on the principle same as that in the supply current detecting unit 13a. For example, the short-circuit current detecting unit 17 may measure a value of a magnetic field generated by current flowing through the superconducting coil 3 or any other part (e.g., the above-mentioned short-circuit path) to detect a magnitude of current flowing through the above-mentioned short-circuit path, based on this measured value.

After recovery from the abnormal state, the short-circuit current comparing unit 19 determines whether or not magnitude of current detected by the short-circuit current detecting unit 17 is equal to or smaller than a set value (zero or a value close to zero). This set value is a value within a range of no less than 0 A and no more than 1 A, for example. Preferably, this set value is a value within a range of no less than 0 A and no more than 0.2 A.

When a result of the determination by the short-circuit current comparing unit 19 is affirmative, a removal signal output unit 21 outputs a short-circuit removal signal to the activation device 15. In this case, in response to receiving the short-circuit removal signal, or receiving both the short-circuit removal signal and a short-circuit removal command, the activation device 15 removes the short-circuit path formed by the protector 9. Here, the short-circuit removal command is output from a command output unit (not illustrated) to the activation device 15 after recovery from the abnormal state. This command output unit outputs the short-circuit removal command to the activation device 15, for example, in response to resumption of the supply of current from the power supply 5 to the superconducting coil 3, or in response to an event that a person operates an appropriate operation unit (e.g., a button) at the time of the resumption.

FIG. 4 is a flowchart illustrating a method for limiting a current decrease in the case of an abnormality of the superconducting magnet device 10 described above.

FIG. 5A to FIG. 6B are diagrams for illustrating this method for limiting a current decrease. In FIG. 5A to FIG. 6B, each path through which current is flowing is indicated by the thick line. Note that in FIG. 5A to FIG. 6B, the supply current comparing unit 13b, the short-circuit signal outputting unit 13c, and the like are not illustrated.

Figure 5A:
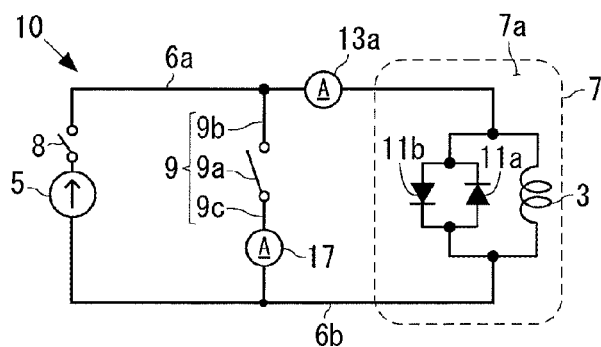
FIG. 5A is a diagram for illustrating a procedure of the method for limiting the current decrease.

At the step S1, the above-described superconducting magnet device 10 is installed. This state is illustrated in FIG. 5A. In FIG. 5A, no current flows yet.

Figure 5B:
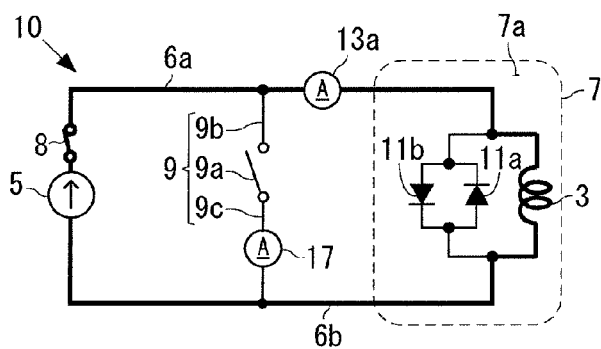
FIG. 5B is another diagram for illustrating the procedure of the method for limiting the current decrease.

At the step S2, generation of a magnetic field by the superconducting magnet device 10 is started as follows. At the step S1, the superconducting coil 3 in the cooling container 7 is cooled as described above to make the temperature of the internal space 7a of the cooling container 7 equal to or lower than the transition temperature of the high-temperature superconducting wire that forms the superconducting coil 3. This brings the superconducting coil 3 into the superconducting state. Further, at the step S2, for example, a switch 8 (see FIG. 5A to FIG. 5C) is closed when the switch 9a is open, so that current from the power supply 5 flows through the superconducting coil 3 in the superconducting state to generate a magnetic field in the superconducting coil 3. At this time, since an inductance of the superconducting coil 3 is large (e.g., a value within a range of 10 H to 2000 H; preferably a value within a range of 50 H to 1000 H), a value of current flowing through the superconducting coil 3 is increased from zero up to the rated current value as a target value (preferably a value within a range of no less than 50 A and no more than 2000 A) over a long time period (more than half a day, for example, one day to one month) such that the superconducting coil 3 does not generate heat. This state is illustrated in FIG. 5B. In FIG. 5B, the current is flowing through a closed circuit including the superconducting coil 3 and the constant current source 5 (i.e., a circuit indicated by the thick line in this figure).

Figure 5C:
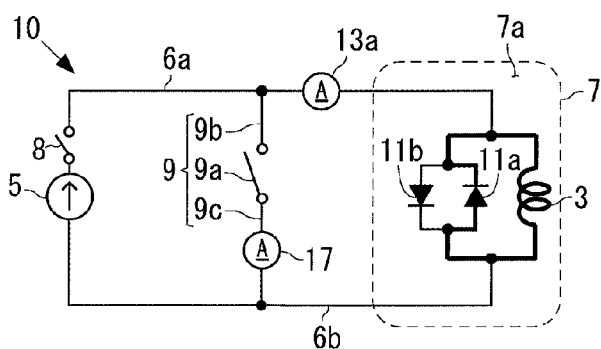
FIG. 5C is still another diagram for illustrating the procedure of the method for limiting the current decrease.

Although the switch 8 is provided on the positive electrode side of the power supply 5 in FIG. 5A to FIG. 5C, the switch 8 may be provided on the negative electrode side of the power supply 5, or on both of the positive electrode side and the negative electrode side.

Thus, at the step S2, the current of the rated current value flows through the superconducting coil 3 in the superconducting state so that the superconducting coil 3 generates a magnetic field. Then, the procedure proceeds to the step S3 in this state.

At the step S3, the detector 13 determines presence or absence of occurrence of an abnormal state of the supply of current from the power supply 5 to the superconducting coil 3 while the superconducting coil 3 is generating the magnetic field. When the detector 13 detects the abnormal state, the procedure proceeds to the step S4. When the abnormal state is not detected, the determination at the step S3 is repeated.

The abnormal state may be malfunction of the power supply 5, for example. When a failure of the power supply 5 occurs, the switch 8 illustrated in FIG. 5A to FIG. 6B is automatically opened to disconnect the power supply 5 electrically from the superconducting coil 3. Thus, the state of FIG. 5B is shifted to the state of FIG. 5C. In FIG. 5C, the current of the superconducting coil 3 flows in a closed circuit (i.e., a circuit indicated by the thick line in this figure) including the superconducting coil 3 and the reverse diode 11a. In this abnormal state, since a current value detected by the supply current detecting unit 13a is substantially smaller than the above-described rated current value and does not satisfy the above-described set condition, this abnormal state is detected by the detector 13.

In another example, the abnormal state may be a power failure or a momentary drop. In other words, when power is not supplied to the power supply 5 due to the power failure or momentary drop, the power supply 5 cannot supply current to the superconducting coil 3. Even in this case, the state of FIG. 5B is shifted to a state equivalent to the state of FIG. 5C, and this abnormal state is detected by the detector 13. Note that for the case where the abnormal state is the power failure or the momentary drop, the detector 13, the activation device 15, and the like may be operated by an auxiliary power supply, or a device for making the switch 9a automatically brought into the closed state when the power supply is lost may be used.

Figure 6A:
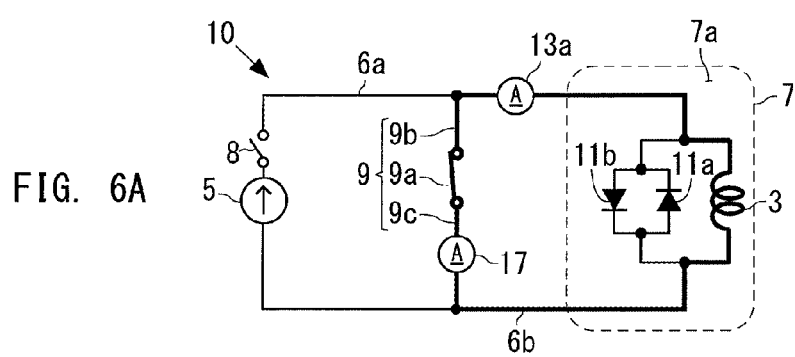
FIG. 6A is yet another diagram for illustrating the procedure of the method for limiting the current decrease.

At the step S4, the detector 13 outputs the short-circuit signal to the activation device 15. This causes the activation device 15 to activate the protector 9 so as to form the short-circuit path in which both ends of the superconducting coil 3 are short-circuited to each other. This state illustrated in FIG. 6A. In FIG. 6A, current flows through a closed circuit (i.e., a circuit indicated by the thick line in this figure) including the superconducting coil 3 and the protector 9 (switch 9a). The electric resistance value of this closed circuit is desirably zero, or a value larger than zero but not larger than 75 mΩ, and is more preferably zero, or a value larger than zero but not larger than 30 mΩ. Note that the resistance of this closed circuit may be made to be zero or a value very close to zero by forming the entire closed circuit including the switch 9a using superconducting wires (high-temperature superconducting wires, or a high-temperature superconducting wire and a low-temperature superconducting wire). For example, when a low-temperature superconducting wire is used in this closed circuit, the internal space 7a of the cooling container 7 is already cooled, by liquid helium for example, to the transition temperature of the low-temperature superconducting wire or lower at the step S2. In this case, the entire closed circuit may be arranged in the internal space 7a. After the step S4, the procedure proceeds to the step S5.

Note that a current attenuation rate during activation of the protector 9 (in the state of FIG. 6A) is desirably equal to or less than ½, more desirably equal to or less than ⅕, of the current attenuation rate during activation of the reverse diode 11a (in the state of FIG. 5C). In other words, a voltage between both ends of the protector 9 (between the halfway points P1 and P2 in FIG. 3A) during activation of the protector 9 (in the state of FIG. 6A) is desirably 0.75 V or lower, and more desirably 0.3 V or lower.

Preferably, even during a period in which a value of current flowing through the superconducting coil 3 is increased from zero up to the rated current value as the target value at the step S2 described above, the determination at the step S3 described above is repeated. Then, once the abnormal state is detected at the step S3, the step S4 described above is performed. Even in this case, the procedure proceeds to the step S5 after the step S4.

At the step S5, a person does recovery work such as repair or replacement of the power supply 5. Thus, the abnormal state is eliminated, and the procedure proceeds to the step S6.

Figure 6B:
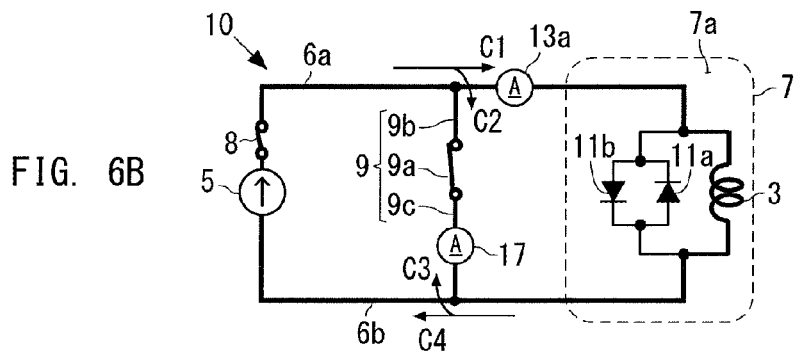
FIG. 6B is yet another diagram for illustrating the procedure of the method for limiting the current decrease.

At the step S6, the supply of current from the normal power supply 5 to the superconducting coil 3 is resumed. In other words, for example, current flows to the superconducting coil 3 from a repaired power supply 5 or a new power supply 5 with which the failed power supply 5 is replaced. For example, the step S6 may be performed such that the person who did the work at the step S5 presses a button to activate the power supply 5. At the step S6, a value of current supplied from the power supply 5 to the superconducting coil 3 is made to be gradually increased. This state is illustrated in FIG. 6B. In FIG. 6B, current flows through a closed circuit (i.e., a circuit indicated by the thick line in this figure) including the superconducting coil 3 and the constant current source 5. As illustrated in FIG. 6B, the current from the constant current source 5 is divided into current C1 flowing to the superconducting coil 3 and current C2 flowing to the switch 9a, and the current C1 flowing through the superconducting coil 3 is divided into current C3 flowing to the switch 9a and current C4 flowing to the constant current source 5. Therefore, the current C2 and the current C3 cancel each other. When the current from the power supply 5 is increased, the current (C3−C2) flowing through the switch 9a is gradually decreased. Then, when the current C2 and the current C3 becomes equal to each other in magnitude, the current flowing through the switch 9a becomes zero.

At the step S7, the short-circuit current comparing unit 19 detects magnitude of current flowing through the short-circuit path (switch 9a), and determines whether or not this detected value becomes equal to or smaller than the above-mentioned set value. This set value is zero or a value (e.g., a value larger than 0 A but not larger than 5 A) close to zero. When the determination at the step S7 is affirmative, the procedure proceeds to the step S8, and when the determination is negative, the determination at the step S7 is repeated.

At the step S8, the removal signal output unit 21 outputs a removal signal to the activation device 15 to cause the activation device 15 to remove the short-circuit path. In the present embodiment, the activation device 15 opens the switch 9a at the step S8. Thus, the state returns to the state of FIG. 5B.

Next, at the step S8, the current supplied from the constant current source 5 to the superconducting coil 3 is increased until a value of current flowing through the superconducting coil 3 becomes the above-mentioned rated current value. Thus, in a state where the current of the rated current value is flowing through the superconducting coil 3 in the superconducting state, the procedure returns to the step S3 to repeat processing in the step S3 to the step S8 described above.

(Effects of the Embodiment)

According to the superconducting magnet device 10 and the method for limiting a current decrease in the above-described embodiment of the present invention, a short-circuit path is formed by the protector 9 when it is detected that supply of current to the superconducting coil 3 comes to be in an abnormal state while current is flowing from the power supply 5 to the superconducting coil 3 in the superconducting state to generate a magnetic field by the superconducting coil 3. Thus, a closed circuit including the superconducting coil 3 and the short-circuit path is formed. Therefore, the current flowing through the superconducting coil 3 is circulated through this closed circuit. Since the electric resistance of this closed circuit is very small, a decrease in current circulating through the closed circuit can be limited.

Thus, even when current is no longer supplied from the power supply 5, the superconducting coil 3 can continue to generate a magnetic field (which is not zero) for a certain period of time (e.g., six hours to a few days).

Further, even when there is the above-described hysteresis loss in the superconducting coil 3, thermal runaway due to the hysteresis loss can be prevented.

Further, when the power supply 5 is recovered in a certain period of time (for example, six hours to a few days) after the current is no longer supplied from the power supply 5, the current flowing through the closed circuit is still high enough at the time of completion of the recovery. Therefore, after completion of the recovery, it is unnecessary to increase a value of current flowing through the superconducting coil 3 from zero when the supply of current from the power supply 5 is resumed. Accordingly, the time required to increase the current value gradually to the target value is shortened. For example, even when the above-described abnormal state occurs at midnight, and recovery work is started early in the morning and completed before the noon of the same day, it takes short time to increase the current value gradually to the target value after completion of the recovery.

Further, at the step S7 described above, when it is detected that magnitude of current flowing through the short-circuit path becomes equal to or smaller than a set value, the activation device 15 removes the short-circuit path. This can prevent a current value of the superconducting coil 3 from fluctuating due to the current of the short-circuit path at the time of returning to the original state.

Further, the fact that a superconducting coil 3 incapable of being operated in the persistent current mode is excited by a power supply leads to the fact that the power supply 5 is kept connected to the superconducting coil 3 for a correspondingly long period of time. In this case, there is a problem that a probability of encountering a power supply failure or abnormality is significantly high. In the past, there was only a superconducting magnet device which was operated in the persistent current mode or repeatedly magnetized and demagnetized at short intervals. The problem which is not expected for low-temperature superconducting magnets can be solved by the superconducting magnet device 10.

[Calculation of Current Decrease Rate in Case of Abnormality]

In FIG. 3A, when the power supply 5 is disconnected from the superconducting coil 3, and current I flows through the closed circuit including the superconducting coil 3 and the reverse diode 11a, the following equation is established at the moment of closing the switch 9a.

$$Vp = RI + L \times dI/dt = 0.$$

Here, Vp denotes a potential difference between both ends of the short-circuit path including the switch 9a, R denotes an electric resistance value of a closed circuit (a closed circuit indicated by the thick line in FIG. 6A, referred to as a closed circuit X below) formed by closing the switch 9a, and L denotes an inductance of the superconducting coil 3. The symbol R is approximately equivalent to a value indicative of magnitude of electric resistance of the first current path 6a and the second current path 6b, which is assumed to be 2.837 mΩ here. Further, it is assumed that L is 74 H and I is 50 A. In this case, a decrease rate of current flowing through the closed circuit X is $1.91 \times 10^{-3}$ A/sec.

[Measurement of Current Decrease Rate in Case of Abnormality]

In FIG. 3A, when the power supply 5 was disconnected from the superconducting coil 3, and a current of 50 A flowed through the closed circuit including the superconducting coil 3 and the reverse diode 11a, the switch 9a was closed, and a decrease rate of current flowing through the closed circuit X was measured. This measured value is $3.97 \times 10^{-3}$ A/sec.

Note that an electric resistance value of the closed circuit X calculated from the measured value of this decrease rate is 5.87 mΩ. The reason why the measured value of the current decrease rate is greater than the above calculated value is that a value of very small electric resistance of the protector 9 is reflected.

For comparison, in FIG. 3A, a decrease rate of current flowing through a closed circuit Y was measured when the power supply 5 was disconnected from the superconducting coil 3 and the same current of 50 A as mentioned above flowed through the closed circuit Y including the superconducting coil 3 and the reverse diode 11a. This measured value is $2 \times 10^2$ A/sec, which is five to ten times of the measured value in the case of the closed circuit X.

Further, in this case, liquid helium inside the cooling container 7 (cryostat) was evaporated and ejected from a safety valve due to one or both of heat generation in the reverse diode 11a and heat generation by the above-mentioned hysteresis loss. In this state, when the protector 9 was activated, the ejection of helium gas was stopped, and a potential difference Vc ($= -L \times dI/dt$) between both ends of the superconducting coil 3 was also decreased from 1.5 V (i.e., voltage of the reverse diode 11a) to 0.12 V. This means that the current attenuation rate ($dI/dt = -Vc/L$) became equal to or less than one-tenth of that.

Thus, it is possible to accomplish a transition from a dangerous state in which the reverse diode 11a is activated to rapidly attenuate current to a safe state in which current decreases slowly by the protector 9 (i.e., a state in which one or both of heat generation in the reverse diode 11a and heat generation due to the above-described hysteresis loss of the superconducting coil 3 falls below the cooling capacity). This can be achieved even when the protector 9 is placed on the room temperature side. In other words, even a short circuit (the short-circuit path by the protector 9) having electric resistance that is not zero can function sufficiently as the protection circuit.

Figure 7A:
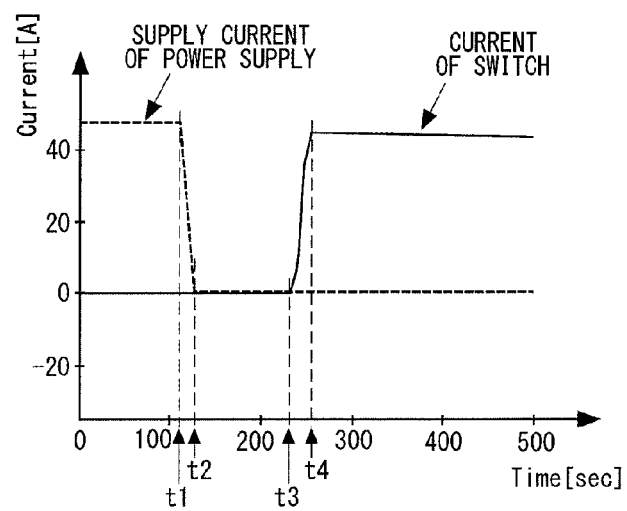
FIG. 7A is a graph illustrating a measured value of current in the superconducting magnet device of FIG. 3A.
Figure 7B:
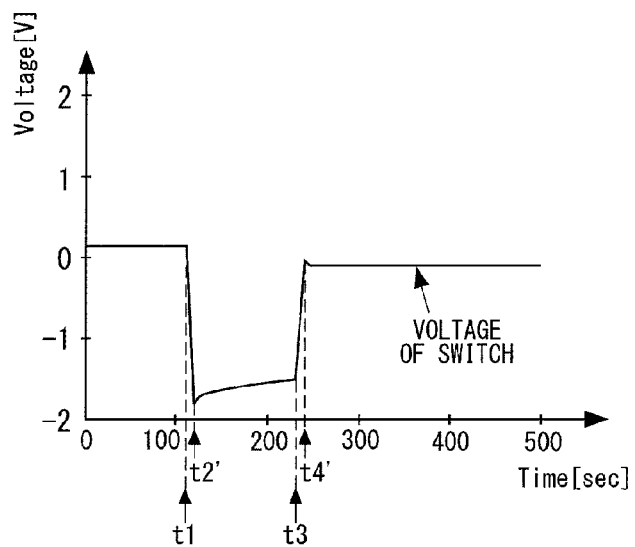
FIG. 7B is a graph illustrating a measured value of voltage in the superconducting magnet device of FIG. 3A.

FIG. 7A and FIG. 7B illustrate changes in current and voltage when the protector 9 is activated after the power supply 5 is disconnected from the superconducting coil 3.

In FIG. 7A, the horizontal axis indicates time, and the vertical axis indicates a current value, where the broken-line graph represents a value of current supplied from the power supply 5 to the superconducting coil 3, and the solid-line graph represents a value of current flowing through the switch 9a. In FIG. 7A, the value of current from the power supply 5 suddenly decreases in a period from time point t1 to time point t2 since the power supply 5 is disconnected from the superconducting coil 3, and the value of current flowing through the switch 9a suddenly rises in a period from time point t3 to time point t4 since the fact that the switch 9a is closed. After time point t4, a decrease rate of the current value is low and about $3\times10^{-3}$ A/sec. Therefore, for example, when the current supplied to the superconducting coil 3 before time point t1 is set to be equal to or higher than 500 A, current having a value (400 A or higher) of 80% or more of that remains flowing through the closed circuit X even after the lapse of six hours from t4.

In FIG. 7B, the horizontal axis indicates time, and the vertical axis indicates voltage value, where the solid-line graph represents a voltage between both ends of the switch 9a in the case of FIG. 7A. In FIG. 7B, a potential difference between both ends of the switch 9a suddenly decreases (the magnitude of the potential difference suddenly increases) in a period from time point t1 to time point t2' since the power supply 5 is disconnected from the superconducting coil 3 and thus, current flows through the reverse diode 11a. Meanwhile, a potential difference in the switch 9a suddenly increases (magnitude of the potential difference suddenly decreases) to almost zero in a period from time point t3 to time point t4' since the switch 9a is closed. By taking into account that the magnitude of V after time point t4' is equal to or less than one-tenth of the magnitude of V in a period from time point t2' to time point t3' in FIG. 7B, and the relation of $Vc=-L\times dI/dt$ is established, it is found that a current decrease rate after time point t4' becomes equal to or less than one-tenth of a current decrease rate in the period from time point t2' to time point t3'. Here, Vc denotes a potential difference between both ends of the superconducting coil 3, L denotes an inductance of the superconducting coil 3, and dI/dt denotes a time differential of current.

[Measurement of Varying Current at Time of Recovery]

Figure 8:
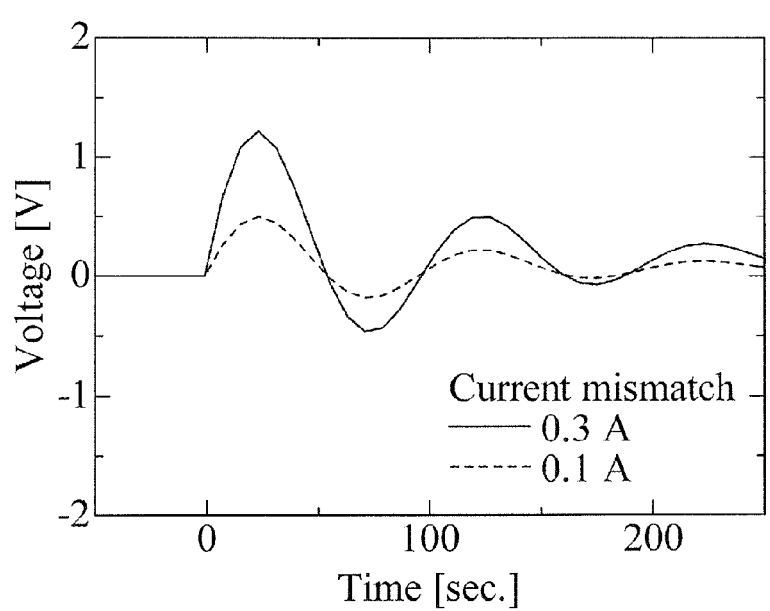
FIG. 8 is a graph illustrating fluctuations in current values when a short-circuit path is removed.

FIG. 8 illustrates fluctuations in values of current flowing through the superconducting coil 3 at the time of returning to the original state. In FIG. 8, the broken line represents a value of voltage (corresponding to a value of current) flowing through the superconducting coil 3 when the short-circuit path is removed in a state where a current flowing through the short-circuit path is 0.1 A. In FIG. 8, the solid line represents a value of voltage flowing through the superconducting coil 3 when the short-circuit path is removed in a state where a current flowing through the short-circuit path is 0.3 A. In FIG. 8, a time point at which the time on the horizontal axis is zero is a time point at which the short-circuit path is removed. It is found from FIG. 8 that a fluctuation in current value is limited when current flowing through the short-circuit path is low. Here, the current value of the short-circuit path in each case was low such that the device is not damaged.

[Example of Application to Maglev Train]

Description is made on an example in which the above-mentioned superconducting magnet device 10 is applied to use in a maglev train.

Plural (e.g., five) superconducting magnet devices 10 are mounted on plural (e.g., five) cars in a maglev train, respectively. Although one power supply 5 is mounted on each car, an auxiliary power supply is also mounted on the maglev train. When an abnormal state (an abnormality of the power supply 5) in any of the superconducting magnet devices 10 is detected by the detector 13, a control unit (central control-management unit) of the maglev train opens the above-described switch 8 in the superconducting magnet device 10 to disconnect the power supply 5 from the superconducting coil 3. Next, at the step S6 described above, the control unit connects the above-mentioned auxiliary power supply as a normal power supply 5 for replacement electrically to the superconducting coil 3 in the superconducting magnet device 10 to resume the supply of current to the superconducting coil 3.

In this case, this control unit acquires measurement results and detection results including the abnormality of the power supply 5 of each car and including electrical quantities (current value, voltage value, and the like) of an electric circuit system including the superconducting magnet device 10 of each car, and performs a series of control operations by software incorporated in advance.

Note that the present invention is not limited to the above-mentioned embodiment, and various changes can be added without departing from the scope of the present invention. For example, any one of the following modifications 1 to 8 may be adopted, or any possible combination of two or more of the modifications 1 to 8 may be adopted.

(Modification 1)

Figure 9:
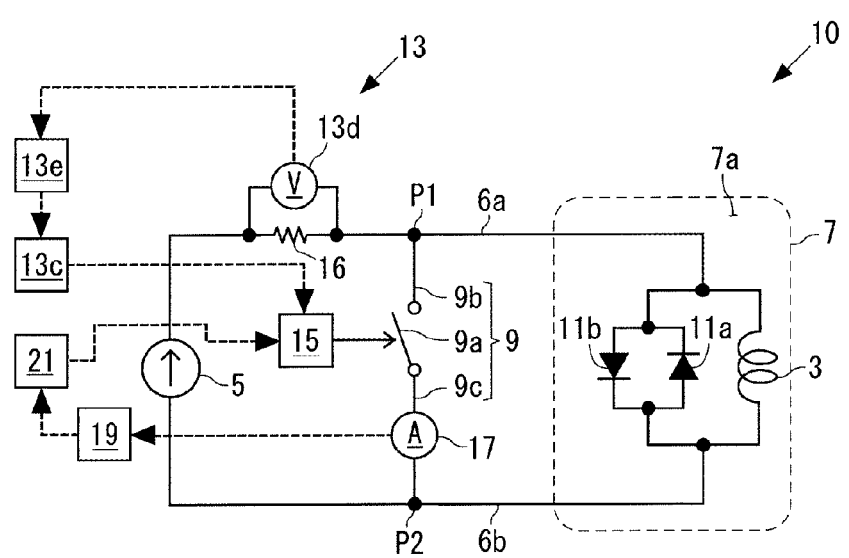
FIG. 9 is a circuit diagram of a superconducting magnet device according to a modification 1 of the present invention.

FIG. 9 is a circuit diagram of a superconducting magnet device 10 according to the modification 1 of the present invention. In the modification 1, as illustrated in FIG. 9, a detector 13 includes a voltage detection unit 13d, a voltage comparison unit 13e, and a short-circuit signal outputting unit 13c.

The voltage detection unit 13d detects voltage (potential difference) between two points of the current path (first current path 6a or second current path 6b) that connects the power supply 5 and the superconducting coil 3. As in FIG. 8, an electric resistor 16 having an electric resistance of a known value may be provided between these two points.

Preferably, the voltage detection unit 13d detects magnitude of a voltage between two points on the side of the power supply 5 with respect to the connecting point P1 between the first conductive path 9b and the first current path 6a as in FIG. 8, or detects magnitude of a voltage between two points on the side of the power supply 5 with respect to the connecting point P2 between the second conductive path 9c and the second current path 6b. However, the detector 13 may be configured so as to detect magnitude of a voltage between any other two points (e.g., one point on the first conductive path 9b and one point on the second conductive path 9c) of the current path that connect the power supply 5 and the superconducting coil 3. Thus, there are variations of the two points.

The voltage comparison unit 13e determines whether or not the magnitude of the voltage detected by the voltage detection unit 13d satisfies a set condition. This set condition is a condition that the magnitude of the voltage detected by the voltage detection unit 13d is larger than a threshold value, or a condition that the magnitude of this voltage is within a set range. This threshold value may be zero, a value close to zero, or a predetermined percentage (e.g., any percentage equal to or larger than 10%) of magnitude of a voltage detected by the voltage detection unit 13d at the normal time. The set range may be a range of voltage magnitude detected by the voltage detection unit 13d at the normal time, or a range close to this range. When the voltage comparison unit 13e determines that the magnitude of the voltage detected by the voltage detection unit 13d does not satisfy the above-mentioned set condition (i.e., the magnitude of the voltage is equal to or smaller than the threshold value, or the magnitude of the voltage is smaller or larger than the set range), the short-circuit signal outputting unit 13c outputs, to the activation device 15, a short-circuit signal indicating the occurrence of an abnormal state. This causes the activation device 15 to activate the protector 9 in the manner as described above.

(Modification 2)

Figure 10A:
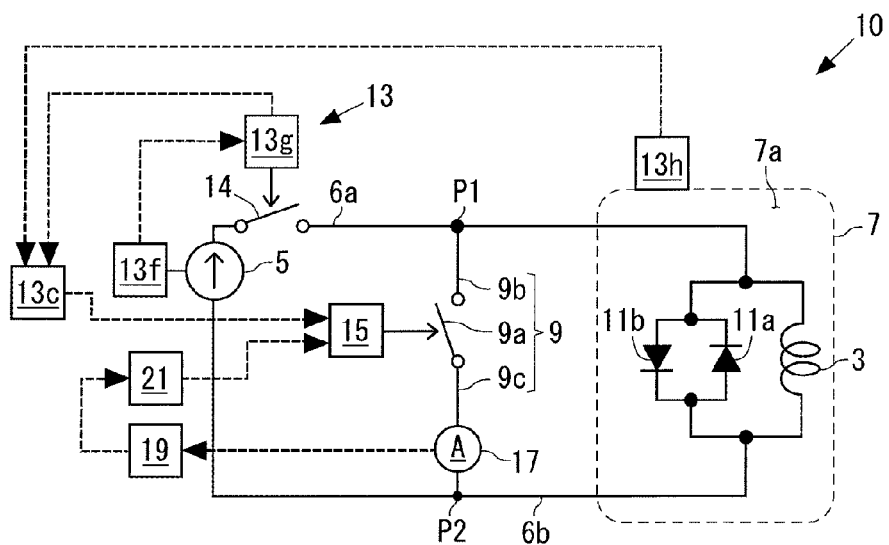
FIG. 10A is a circuit diagram of a superconducting magnet device according to a modification 2 of the present invention.

FIG. 10A is a circuit diagram of a superconducting magnet device 10 according to the modification 2 of the present invention. In the modification 2, as illustrated in FIG. 10A, the detector 13 includes a power abnormality detecting unit 13f, a stop operation unit 13g, and a short-circuit signal outputting unit 13c.

The power abnormality detecting unit 13f detects an abnormality of the power supply 5. For example, the power abnormality detecting unit 13f detects, as the abnormality of the power supply 5, the fact that a value of current supplied from the power supply 5 becomes larger or smaller than an allowable range, or the power abnormality detecting unit 13f detects, as the abnormality of the power supply 5, the fact that a state (e.g., in a flow rate or a temperature) of a refrigerant (cooling water or cooling air) for cooling the power supply 5 comes to be outside an allowable range. In another example, the power abnormality detecting unit 13f detects, as the abnormality of the power supply 5, the fact that a temperature of the power supply 5 becomes equal to or greater than an upper limit value. In still another example, the power abnormality detecting unit 13f detects, as the abnormality of the power supply 5, the fact that a magnetic field in the vicinity of the power supply 5 becomes larger or smaller than the allowable range.

When the power abnormality detecting unit 13f detects an abnormality of the power supply 5, the stop operation unit 13g stops the supply of current from the power supply 5 to the superconducting coil 3. In other words, the stop operation unit 13g electrically disconnects the power supply 5 from the superconducting coil 3. For example, the stop operation unit 13g opens a switch 14 provided in the first current path 6a (or the second current path 6b) to stop the supply of current to the superconducting coil 3.

According to the modification 2, when the power abnormality detecting unit 13f detects an abnormality of the power supply 5, the short-circuit signal outputting unit 13c outputs a short-circuit signal to cause the activation device 15 to form a short-circuit path as described above. In other words, the short-circuit signal outputting unit 13c outputs, to the activation device 15, the short-circuit signal indicating the occurrence of an abnormal state, in response to the fact that the power abnormality detecting unit 13f detects the abnormality of the power supply 5 or in response to the fact that the stop operation unit 13g stops the above-described supply of current.

Instead, when the power abnormality detecting unit 13f detects the abnormality of the power supply 5, the stop operation unit 13g reacts to this to open the above-described switch 14 so as to stop the supply of current to the superconducting coil 3. After that, the short-circuit signal outputting unit 13c determines whether or not the protector 9 needs to be activated, and when determining that this activation is necessary, outputs the short-circuit signal to the activation device 15. In this case, for example, when a sensor 13h (see FIG. 10A) detects an abnormality of the cooling container 7, the sensor 13h outputs a signal indicative of this to the short-circuit signal outputting unit 13c to cause the short-circuit signal outputting unit 13c to output the short-circuit signal to the activation device 15. Here, the abnormality of the cooling container 7 may be the fact that a level of the liquid surface of a liquid refrigerant in the internal space 7a of the cooling container 7 becomes lower than a lower limit value, or any other abnormality.

This detector 13 may be incorporated in the power supply 5.

Figure 10B:
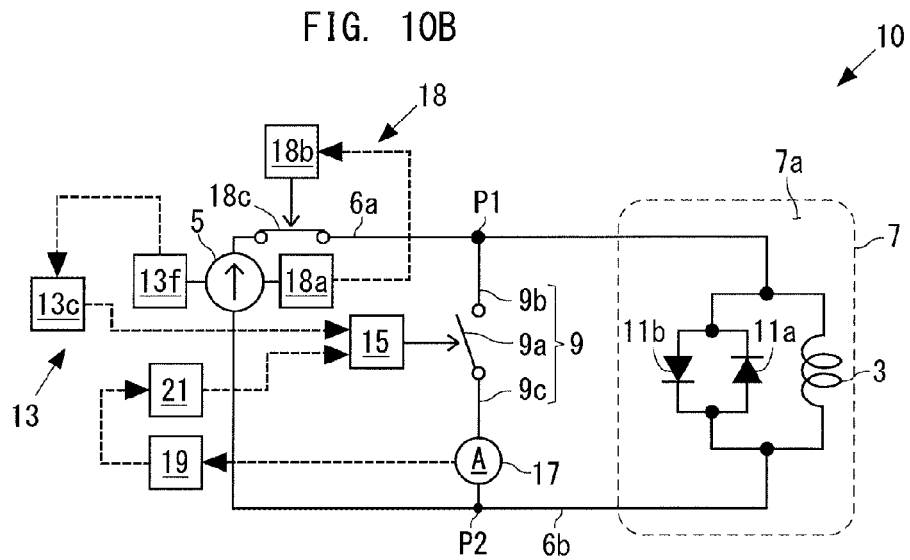
FIG. 10B is another circuit diagram of the superconducting magnet device according to the modification 2 of the present invention.

Further, in the modification 2, the stop operation unit 13g may be omitted. In this case, the power abnormality detecting unit 13f causes the short-circuit signal outputting unit 13c to output the short-circuit signal in response to the fact that the power abnormality detecting unit 13f detects an abnormality of the power supply 5. In this case, the power supply 5 and the superconducting coil 3 may not necessarily be disconnected from each other. For example, as in FIG. 10B, when a safety device 18 provided for the power supply 5 instead of the stop operation unit 13g and the switch 14 is about to be activated, if the power abnormality detecting unit 13f detects an abnormality of the power supply 5 to cause the short-circuit signal outputting unit 13c to output the short-circuit signal so that the protector 9 forms the short-circuit path, this safety device 18 does not need to be actually activated or may be activated after the formation of the short-circuit path. Note that the power supply 5 is actually disconnected from the superconducting coil 3 by activating this safety device 18. FIG. 10B illustrates a configuration of the superconducting magnet device 10 when the safety device 18 is provided.

For example, the safety device 18 includes a power monitoring unit 18a, an activating unit 18b, and a switch 18c. When detecting an abnormality of the power supply 5, the power monitoring unit 18a outputs an activation signal to the activating unit 18b. The activating unit 18b operates to open the switch 18c in response to receiving the activation signal from the activating unit 18b.

The power monitoring unit 18a detects, as the abnormality of the power supply 5, the fact that a value of current supplied from the power supply 5 becomes larger or smaller than an allowable range (e.g., an allowable range wider than the above-mentioned allowable range used by the power abnormality detecting unit 13f), or the power monitoring unit 18a detects, as the abnormality of the power supply 5, the fact that a state (e.g., a flow rate or a temperature) of a refrigerant (cooling water or cooling air) for cooling the power supply 5 comes to be outside an allowable range (e.g., an allowable range wider than the above-mentioned allowable range used by the power abnormality detecting unit 13f). In another example, the power monitoring unit 18a detects, as the abnormality of the power supply 5, the fact that a temperature of the power supply 5 becomes equal to or greater than an upper limit value (e.g., an upper limit value higher than the above-mentioned upper limit value used by the power abnormality detecting unit 13f). Note that the power monitoring unit 18a may be omitted so that the activating unit 18b operates to close the switch 18c in response to the fact that the power abnormality detecting unit 13f detects the abnormality of the power supply 5.

(Modification 3)

The superconducting coil 3 may be used in combination with another coil.

Figure 11:
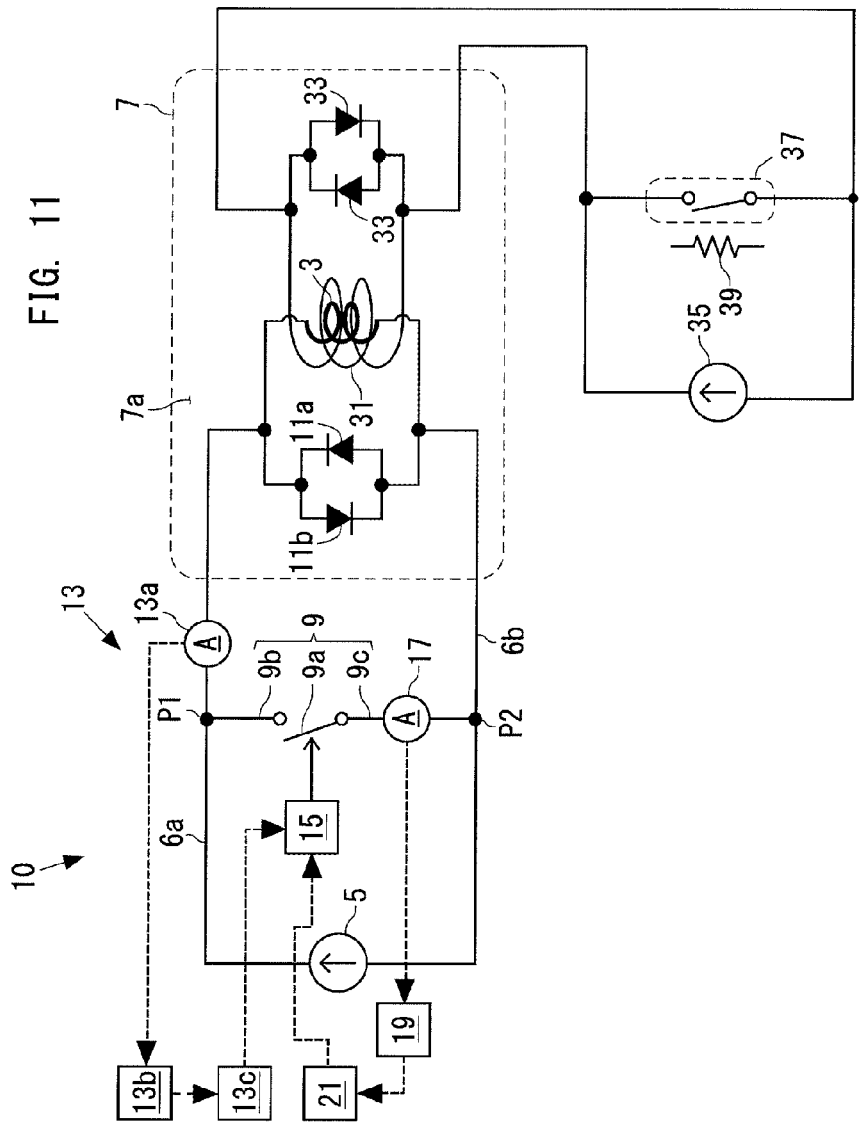
FIG. 11 illustrates an example of a configuration of a superconducting magnet device according to a modification 3.

For example, as illustrated in FIG. 11, a low-temperature superconducting coil 31 formed of a low-temperature superconducting wire is arranged outside of the superconducting coil 3, in the internal space 7a of the cooling container 7. In FIG. 11, the superconducting coil 3 is indicated by the thick line to distinguish the superconducting coil 3 and the low-temperature superconducting coil 31 from each other. For example, in the internal space 7a, the superconducting coil 3 and the low-temperature superconducting coil 31 are coaxially arranged. A circuit (i.e., diodes 33, a power supply 35, and a persistent switch 37 in FIG. 11) for making current flow through the low-temperature superconducting coil 31, and a circuit for making current flow through the superconducting coil 3 are independent of each other. In this case, for example, the internal space 7a is cooled by liquid helium to a temperature equal to or lower than the transition temperature of the low-temperature superconducting wire of the low-temperature superconducting coil 31.

Figure 1B:
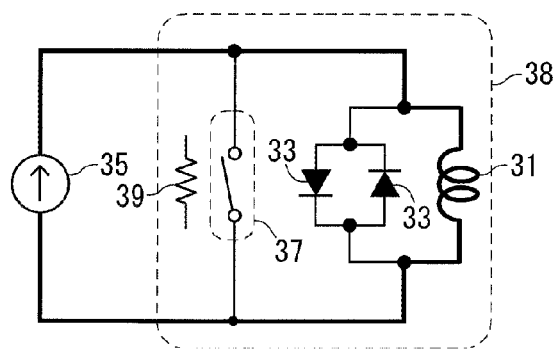
FIG. 1B illustrates a current flowing path in the circuit diagram of FIG. 1A.
Figure 1C:
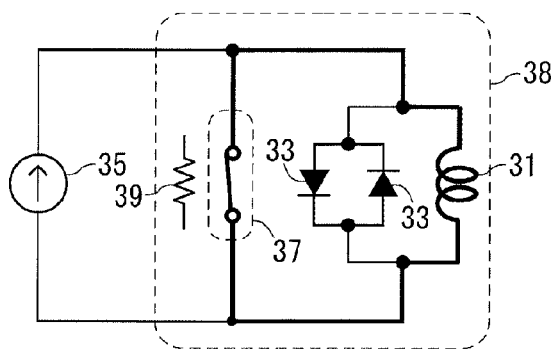
FIG. 1C illustrates another current flowing path in the circuit diagram of FIG. 1A.
Figure 2:
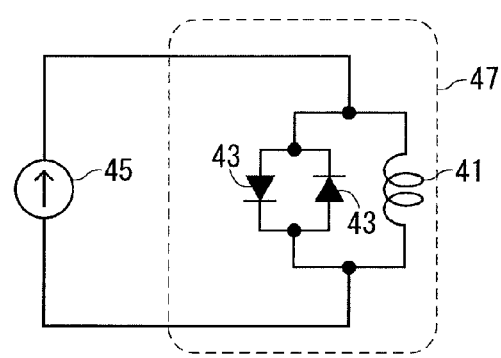
FIG. 2 is a circuit diagram of a superconducting magnet device using a high-temperature superconducting wire.

In FIG. 11, configurations and functions of the low-temperature superconducting coil 31, the diodes 33, the power supply 35, the persistent switch 37, and a heater 39 may be the same as those of the low-temperature superconducting coil 31, the diodes 33, the power supply 35, the persistent switch 37, and the heater 39 described with reference to FIG. 1A to FIG. 1C. By bringing, into the persistent current mode, the circuit for making current flow through the low-temperature superconducting coil 31 as described above, the superconducting coil 31 can continue to generate a magnetic field even in a state where the power supply 35 is disconnected from the low-temperature superconducting coil 31. Instead, the power supply 35 may continue to be connected to the low-temperature superconducting coil 31.

In this case of FIG. 11, a mutual inductance magnetically exists between the superconducting coil 3 and the low-temperature superconducting coil 31. Therefore, when current (magnetic field) of the superconducting coil 3 decreases, current of the superconducting coil 31 increases to cancel the current decrease. When a decrease rate of the current (magnetic field) of the superconducting coil 3 is high, the current of the superconducting coil 31 also increases rapidly if there is no protector 9, and thus, there is a possibility that the superconducting coil 31 is quenched before countermeasures are taken. Even such a situation can be prevented by the protector 9.

(Modification 4)

The above-described reverse diode 11a may be omitted. For example, when the activation device 15 can close the switch 9a before current flows into the reverse diode 11a after the power supply 5 is disconnected from the superconducting coil 3 when an abnormality occurs, it is unnecessary to provide the reverse diode 11a.

(Modification 5)

The protector 9 may be operated manually to form the above-described short-circuit path. In this case, an operation unit (e.g., a button or a lever) capable of being operated by a person may be provided such that the switch 9a is closed or opened by a person operating this operation unit.

In one example, when maintenance of the superconducting magnet device 10 (e.g., maintenance of the power supply 5 or the refrigerator 7e in FIG. 3C) is performed, the switch 9a is closed with a manual operation after the step S2 described above, instead of the steps S3 to S5. Then, in this state, the maintenance is performed. After completion of the maintenance, the steps S6 to S8 are performed. Note that when maintenance of the refrigerator 7e is performed, the superconducting coil 3 can be kept in the superconducting state until the cooling container 7b runs out of the liquid refrigerant even when operation of the refrigerator 7e is stopped.

In the modification 5, the detector 13 may be omitted, but the detector 13 may be provided so that the protector 9 is activated by the detector 13 and the activation device 15.

(Modification 6)

A low-temperature superconducting coil formed of a low-temperature superconducting wire may be connected in series with the superconducting coil 3 described above. In this case, the low-temperature superconducting coil is arranged together with the superconducting coil 3 in the internal space 7a of the cooling container 7 that cools the internal space 7a to a temperature equal to or lower than the transition temperature of the low-temperature superconducting coil, or the low-temperature superconducting coil is arranged in another cooling container cooled to the temperature equal to or lower than the transition temperature of the low-temperature superconducting coil.

Instead, one or more superconducting coils formed of high-temperature superconducting wires may be connected in series with the superconducting coil 3 in the internal space 7a of the cooling container 7. In this case, the protector 9 short-circuits both ends of a part (superconducting coils 3) or the entirety of these superconducting coils that constitute a part of the superconducting magnet device 10.

Instead, the superconducting coils 3 may be configured by connecting, in series with each other, plural superconducting coils formed of high-temperature superconducting wires.

(Modification 7)

Figure 12:
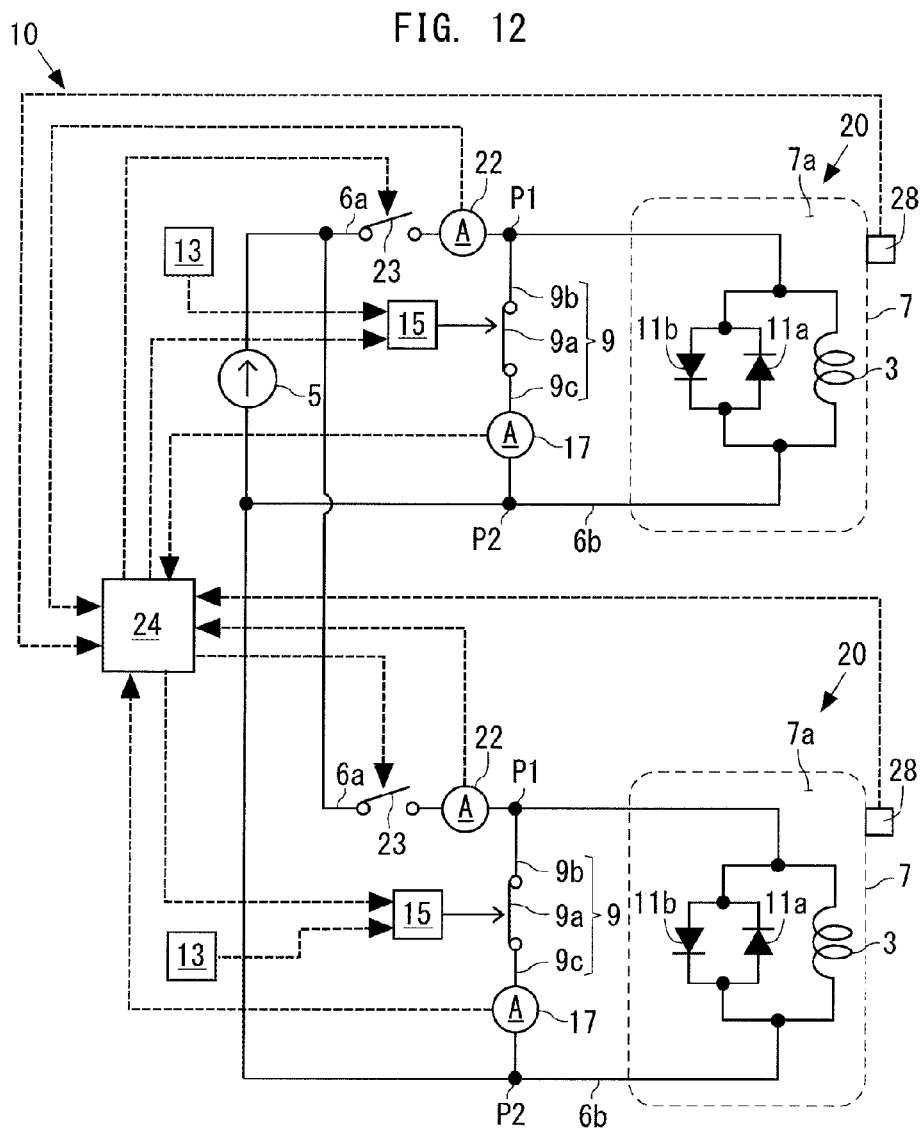
FIG. 12 illustrates an example of a configuration of a superconducting magnet device according to a modification 7.

FIG. 12 illustrates a configuration of a superconducting magnet device 10 according to the modification 7. The superconducting magnet device 10 of the modification 7 is described hereinafter. The superconducting magnet device 10 includes plural magnetic field generators 20. The number of magnetic field generators 20 included in the superconducting magnet device 10 is two in this figure, but may be any number such as three or more. Each magnetic field generator 20 includes the superconducting coil 3, the cooling container 7, the protector 9, the reverse diode 11a, and the forward diode 11b described above.

The superconducting magnet device 10 includes one power supply 5 shared by the plural magnetic field generators 20.

Further, the superconducting magnet device 10 includes a short-circuit current detecting unit 17 which is provided for each magnetic field generator 20 and which detects a value of current flowing through a closed circuit including the superconducting coil 3 and the closed-state switch 9a in the magnetic field generator 20. Here, the detected value of current means magnitude thereof (the same applies to the following).

The superconducting magnet device 10 includes a coil state detecting unit which is provided for each magnetic field generator 20 and which detects a value of current flowing through the superconducting coil 3 or a value of a magnetic field generated by the superconducting coil 3, in a state where the switch 9a is closed. When detecting the value of current flowing through the superconducting coil 3, the coil state detecting unit may be the short-circuit current detecting unit 17, but the present invention is not limited to this. When detecting the value of a magnetic field generated by the superconducting coil 3, the coil state detecting unit is a magnetic field detecting unit 28 provided separately from the short-circuit current detecting unit 17. Here, the value of current or magnetic field detected by the coil state detecting unit means magnitude thereof (the same applies to the following).

Further, the superconducting magnet device 10 includes a supply current detecting unit 22 which is provided for each magnetic field generator 20 and which detects a value of current supplied from the power supply 5 to the magnetic field generator 20 (i.e., to the connecting point P1 between the first current path 6a and the first conductive path 9b in FIG. 12). Here, the detected value of current means magnitude thereof (the same applies hereinafter). The supply current detecting unit 22 is provided on the upstream side of the connecting point P1 in the first current path 6a, or on the downstream side of the connecting point P2 between the second current path 6b and the second conductive path 9c, in the second current path 6b. Note that when the supply current detecting unit 13a in FIG. 3A is provided on the upstream side of the connecting point P1 in the first current path 6a, or on the downstream side of the connecting point P2 in the second current path 6b, the supply current detecting unit 13a may function also as the supply current detecting unit 22.

Like the supply current detecting unit 13a, any of various configurations can be adopted as that of the supply current detecting unit 22 (such as that using the measured value of a magnetic field).

Further, the superconducting magnet device 10 includes a current supply switch 23 which is provided for each magnetic field generator 20 and which is operated between a closed position at which current is supplied from the power supply 5 to the magnetic field generator 20 (to the connecting point P1) and an open position at which the magnetic field generator 20 (connecting point P1) is disconnected from the power supply 5.

The superconducting magnet device 10 includes a control unit 24. The control unit 24 controls the activation device 15, based on the current value or the magnetic field value detected by the supply current detecting unit 22, the coil state detecting unit, or the short-circuit current detecting unit 17 to shift each position of the current supply switch 23 and the switch 9a between the closed position and the open position. In other words, for each magnetic field generator 20, when the current value or the magnetic field value detected by the coil state detecting unit becomes equal to or smaller than a reference value (positive value) in a state where the switch 9a of the protector 9 is closed, the control unit 24 drives the current supply switch 23 of the magnetic field generator 20 to the closed position. After that, when the current value detected by the short-circuit current detecting unit 17 becomes equal to or smaller than the above-described set value in the process of increasing the current supplied from the power supply 5 to the magnetic field generator 20, the control unit 24 drives the switch 9a of the protector 9 to the open position. Then, when the current value detected by the supply current detecting unit 22 becomes the rated current value in the process of further increasing the current supplied from the power supply 5 to the magnetic field generator 20, the control unit 24 drives the switch 9a of the protector 9 to the closed position. After that, when the current value detected by the supply current detecting unit 22 becomes zero in the process of decreasing the current supplied from the power supply 5 to the magnetic field generator 20, the control unit 24 drives the current supply switch 23 to the open position.

In such a superconducting magnet device 10, the following operations (1) to (5) are performed on each magnetic field generator 20 in this order.

(1) The current supply switch 23 is closed in a state where no current is supplied from the power supply 5 to the superconducting coil 3, a current value of the superconducting coil 3 is zero, and the switch 9a is open.

(2) By the above operation (1), current is supplied to the superconducting coil 3 from the power supply 5. In this operation (2), a value of the current is gradually increased. For example, the control unit 24 controls the power supply 5 to gradually increase a value of the current.

The above operations (1) and (2) are performed in the same manner as in the above-described step S2.

(3) When a current value detected by the supply current detecting unit 22 becomes the above-described rated current value as the above-mentioned target value by the above operation (2), the control unit 24 drives the switch 9a to the closed position.

(4) A value of current flowing from the power supply 5 to the magnetic field generator 20 (connecting point P1) is gradually decreased. For example, the control unit 24 controls the power supply 5 to gradually decrease the value of the current.

(5) By the above operation (4), when a value of current flowing from the power supply 5 to the magnetic field generator 20 becomes zero, i.e., when the current value detected by the supply current detecting unit 22 becomes zero, the control unit 24 drives the current supply switch 23 to the open position.

In the above operations (4) and (5), the switch 9a is kept in the closed position.

The above operations (1) to (5) are performed on each magnetic field generator 20 to create a state where the current supply switch 23 is in the open position, the switch 9a is in the closed position in each magnetic field generator 20, and the above-described rated current value (or a current higher than the above reference value) is flowing through a closed circuit (corresponding to the circuit indicated by the thick line in FIG. 6A) including the superconducting coil 3 and the switch 9a (or the magnetic field value detected by the coil state detecting unit is larger than the above reference value). This state is assumed to be a reference state. In this reference state, the following operations (6) to (11) are performed on the superconducting magnet device 10 in this order. Note that the above reference value is smaller than the above rated current value.

(6) In the reference state, when a value of current or magnetic field detected by the coil state detecting unit in any of the magnetic field generators 20 becomes equal to or smaller than the above reference value, the control unit 24 drives the current supply switch 23 of the magnetic field generator 20 concerned to the closed position. The following operations (7) to (11) are performed on the magnetic field generator 20 concerned.

(7) Thus, current is supplied to the superconducting coil 3 from the power supply 5. In this operation (7), the power supply 5 gradually increases a value of the current. For example, the control unit 24 controls the power supply 5 to gradually increase a value of the current. At this time, the switch 9a is in the closed position.

(8) By the above operation (7), when a value of current detected by the short-circuit current detecting unit 17 becomes equal to or smaller than the above set value, the control unit 24 drives the switch 9a to the open position in response to this.

(9) Then, the power supply 5 further gradually increases a value of the current (for example, the control unit 24 controls the power supply 5 to gradually increase a value of the current). Thus, when a current value detected by the supply current detecting unit 22 becomes the above-described rated current value as the above-mentioned target value, the control unit 24 operates the switch 9a to the closed position.

(10) Next, a value of current flowing from the power supply 5 to the superconducting coil 3 is gradually decreased. For example, the control unit 24 controls the power supply 5 to gradually decrease a value of the current.

(11) When a value of current flowing from the power supply 5 to the magnetic field generator 20 becomes zero by the above operation (10), i.e., when the current value detected by the supply current detecting unit 22 becomes zero, the control unit 24 drives the current supply switch 23 to the open position. Thus, the state is returned to the reference state described above. Then, the above operations (6) to (11) are repeated.

Such a superconducting magnet device 10 can be provided in a maglev train. In other words, the superconducting magnet device 10 is provided in the maglev train (traveling vehicle), magnetic fields generated by plural superconducting coils 3 of the superconducting magnet device 10 are used for propulsion and levitation of the maglev train. The above operations (6) to (11) may be performed during traveling of the maglev train. Plural superconducting magnet devices 10 of this type may be provided in the maglev train.

The protector 9 and the short-circuit current detecting unit 17 are provided outside the cooling container 7 in FIG. 12, but may be provided in the internal space 7a of the cooling container 7.

In the modification 7, since one power supply 5 is shared by the plural magnetic field generators 20, The number of used power supplies 5 can be reduced.

Further, when magnitude of current flowing through the superconducting coil 3 or magnitude of a magnetic field generated by the superconducting coil 3 in each magnetic field generator 20 becomes equal to or smaller than the reference value, current is supplied from the power supply 5 to the magnetic field generator 20, so that the number if times of using the power supply 5 can be reduces.

Further, even when the power supply 5 is not connected to the superconducting coil 3, a current decrease can be limited or small.

Even in the modification 7, the detector 13 and the activation device 15 described above are provided in each magnetic field generator 20. Therefore, when an abnormal state occurs while the above-described operation (2) or (9) is being performed, the inspection device 13 and the activation device 15 cause the protector 9 to form the above-described short-circuit path. Thus, the protection function of the protector 9 can be used.

Further, even in the modification 7, the functions of the above-described short-circuit current comparing unit 19 and removal signal output unit 21 are incorporated in the control unit 24. Therefore, opening operation control of the switch 9a based on the short-circuit current detecting function of the short-circuit current detecting unit 17 can be performed by the above operation (8).

(Modification 8)

Description is made on another example in which the superconducting magnet device 10 is applied to the maglev train. The power supply 5 in this case is not provided at the maglev train (i.e., a traveling vehicle), but is provided at a vehicle stop position (a static structure), and the superconducting magnet device 10 except the power supply 5 is provided at the maglev train. The magnetic field generated by the superconducting coil 3 of the superconducting magnet device 10 is used for propulsion and levitation of the maglev train.

In this case, during traveling of the maglev train, the short-circuit path is formed by the protector 9, so that a decrease in current flowing through the superconducting coil 3 can be limited. In the modification 8, the protector 9 has a function of protecting circulating current in terms of limiting a decrease in circulating current. When the maglev train comes to the vehicle stop position, the power supply 5 is joined to the superconducting coil 3 (connecting point P1 and connecting point P2) by appropriate means, and a current supply switch 27 (see FIG. 13 described below) is closed manually or automatically in response to this joining so that current is supplied from the power supply 5 to the superconducting coil 3. When the current flowing through the superconducting coil 3 becomes equal to or larger than the above rated current value, the power supply 5 is disjoined from the superconducting coil 3 (connecting point P1 and connecting point P2) so that the maglev train travels again.

Figure 13:
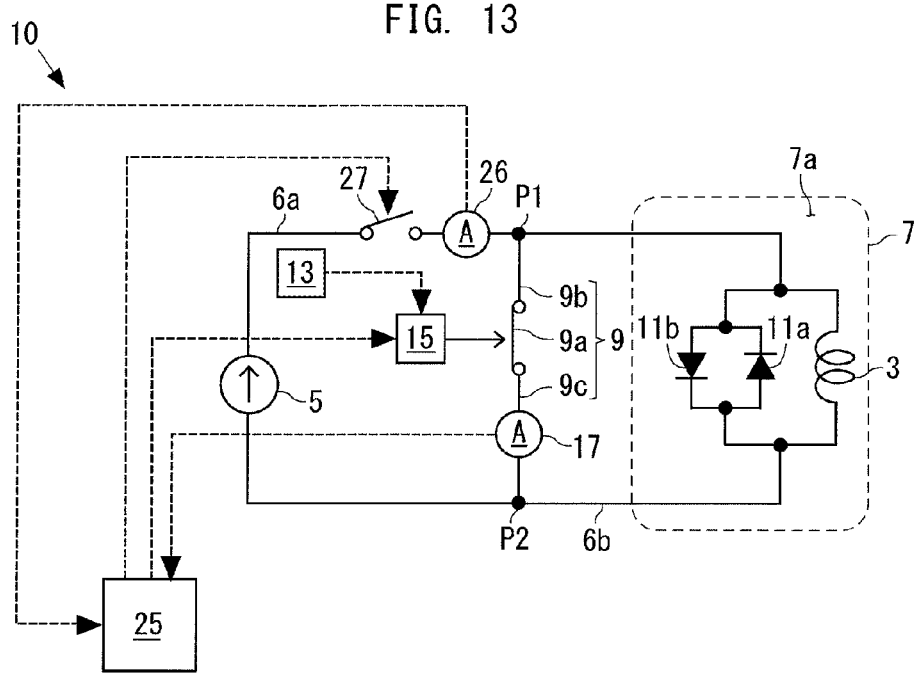
FIG. 13 illustrates a configuration of a superconducting magnet device according to a modification 8.

As illustrated in FIG. 13, the superconducting magnet device 10 includes a supply current detecting unit 26, a current supply switch 27, and a control unit 25.

The supply current detecting unit 26 detects a value (magnitude) of current supplied from the power supply 5 to the superconducting coil 3 (i.e., connecting point P1 between the first current path 6a and the first conductive path 9b in FIG. 13). The configuration and arrangement of the supply current detecting unit 26 are the same as those of the supply current detecting unit 22 in the modification 7.

The current supply switch 27 is driven between a closed position at which current is supplied from the power supply 5 to the superconducting coil 3 (connecting point P1) and an open position at which the superconducting coil 3 (connecting point P1) is disconnected from the power supply 5. The configuration and arrangement of the current supply switch 27 is the same as those of the current supply switch 23 in the modification 7.

The control unit 25 controls the activation device 15, based on the current value detected by the supply current detecting unit 26 to shift each position of the current supply switch 27 and the switch 9a between the closed position and the open position.

When current started to be supplied to the superconducting coil 3 in a state where current flowing through the superconducting coil 3 is zero, the following operations (a) to (f) are performed in this order.

(a) The current supply switch 27 is closed in a state where the maglev train is at the vehicle stop position, no current is supplied from the power supply 5 to the superconducting coil 3, a current value of the superconducting coil 3 is zero, and the switch 9a is open.

(b) By the above operation (a), current is supplied to the superconducting coil 3 from the power supply 5. In this operation (b), a value of the current is gradually increased. For example, the control unit 25 controls the power supply 5 to gradually increase a value of the current.

The above operations (a) and (b) are performed like step S2 described above.

(c) When a current value detected by the supply current detecting unit 26 becomes the above-described rated current value as the target value by the above operation (b), the control unit 25 drives the switch 9a to the closed position.

(d) Next, a value of current flowing from the power supply 5 to the superconducting coil 3 (connecting point P1)

is gradually decreased. For example, the control unit 25 controls the power supply 5 to gradually decrease a value of the current.

(e) When a value of the current flowing from the power supply 5 to the superconducting coil 3 becomes zero by the above operation (d), i.e., when a current value detected by the supply current detecting unit 26 becomes zero, the control unit 25 drives the current supply switch 27 to the open position. Thus, the current circulates through a closed circuit including the superconducting coil 3 and the switch 9a at the closed position.

(f) Next, the power supply 5 is disjoined from the connecting point P1 and the connecting point P2, and the maglev train travels in a state where the switch 9a is at the closed position.

After the above operation (f), when the maglev train comes to the vehicle stop position, the power supply 5 is joined to the connecting point P1 and the connecting point P2, the current supply switch 27 is driven to the closed position, and the following operations (g) to (l) are performed.

(g) Current is supplied to the superconducting coil 3 from the power supply 5 in a state where the switch 9a is at the closed position. In this operation (g), a value of the current is gradually increased. For example, the control unit 25 controls the power supply 5 to gradually increase a value of the current.

(h) When a value of current detected by the short-circuit current detecting unit 17 becomes equal to or smaller than the above set value by the above operation (g), the control unit 25 drives the switch 9a to the open position in response to this.

(i) Then, the power supply 5 further gradually increases the value of the current (e.g., the control unit 25 controls the power supply 5 to gradually increase a value of the current). Thus, when a current value detected by the supply current detecting unit 26 becomes the above-described rated current value as the above-mentioned target value, the control unit 25 drives the switch 9a to the closed position.

(j) Next, a value of current flowing from the power supply 5 to the superconducting coil 3 (connecting point P1) is gradually decreased. For example, the control unit 25 controls the power supply 5 to gradually decrease a value of the current.

(k) When a value of current flowing from the power supply 5 to the superconducting coil 3 becomes zero by the above operation (j), i.e., when a current value detected by the supply current detecting unit 26 becomes zero, the control unit 25 drives the current supply switch 27 to the open position. Thus, the current circulates through a closed circuit including the superconducting coil 3 and the switch 9a at the closed position.

(l) Next, the maglev train travels in a state where the power supply 5 is disjoined from the connecting point P1 and the connecting point P2.

After the above operation (l), when the maglev train comes to the vehicle stop position, the power supply 5 is joined to the connecting point P1 and the connecting point P2, the current supply switch 27 is driven to the closed position, and the above-described operations (g) to (l) are performed again.

The protector 9 and the short-circuit current detecting unit 17 are provided outside the cooling container 7 in FIG. 13, but may be provided in the internal space 7a of the cooling container 7.

In the modification 8, when the maglev train comes to the vehicle stop position, current is supplied from the power supply 5 to the superconducting coil 3, and during traveling of the maglev train, it is unnecessary to supply current from a power supply to the superconducting coil 3, so that the number of times of using the power supply 5 can be reduced.

Further, even when the power supply 5 is not joined to the superconducting coil 3, a current decrease can be limited or small.

Even in the modification 8, the detector 13 and the activation device 15 are provided in the superconducting magnet device 10 in the same manner as described above. Therefore, when an abnormal state occurs while the above operation (b) or (i) is being performed, the inspection device 13 and the activation device 15 cause the protector 9 to form the above-described short-circuit path. Thus, the protection function of the protector 9 can be used.

Further, even in the modification 8, the functions of the short-circuit current comparing unit 19 and the removal signal output unit 21 are incorporated in the control unit 25 in FIG. 13. Therefore, opening operation control of the switch 9a based on the short-circuit current detecting function of the short-circuit current detecting unit 17 can be performed by the above operation (h).

REFERENCE SIGNS LIST 3 superconducting coil, 5 power supply (constant current source), 6a first current path, 6b second current path, 7 cooling container, 7a internal space, 7b inner container, 7c outer container, 7d vacuum layer, 7e refrigerator, 7f refrigerator, 8 switch, 9 protector, 9a switch, 9b first conductive path, 9c second conductive path, 10 superconducting magnet device, 11a reverse diode, 11b forward diode, 13 detector, 13a supply current detecting unit (ammeter), 13b supply current comparing unit, 13c short-circuit signal outputting unit, 13d voltage detection unit, 13e voltage comparison unit, 13f power abnormality detecting unit, 13g stop operation unit, 14 switch, 15 activation device, 16 electric resistance, 17 short-circuit current detecting unit, 18 safety device, 18a power monitoring unit, 18b activating unit, 18c switch, 19 short-circuit current comparing unit, 20 magnetic field generator, 21 removal signal output unit, 22 supply current detecting unit, 23 current supply switch, 24 control unit, 25 control unit, 26 supply current detecting unit, 27 current supply switch, 28

The invention claimed is:

1. A method for limiting a current decrease in a superconducting magnet device, comprising:

(A) installing the superconducting magnet device including a superconducting coil formed of a high-temperature superconducting wire, a power supply which supplies current to the superconducting coil, a protector capable of forming a short-circuit path which short-circuits both first and second ends of the superconducting coil to each other, and a short-circuit current detecting unit, wherein the protector includes a switch, a first end of the switch is connected to a halfway point of a first current path connecting the power supply to the first end of the superconducting coil, a second end of the switch is connected to a halfway point of a second current path connecting the power supply to the second end of the superconducting coil, a diode is connected in anti-parallel with the superconducting coil, and no superconducting coils are provided between the first end of the switch and the first end of the superconducting coil, between the second end of the switch and the second end of the superconducting coil, between the first end of the switch and a first end of the diode, and between the second end of the switch and a second end of the diode;

(B) making current flow from the power supply to the superconducting coil in a superconducting state, and thereby causing the superconducting coil to generate a magnetic field; and (C) after the magnetic field is generated by the (B), when an abnormality of the superconducting magnet device is detected, or when the power supply and the superconducting coil are disconnected from each other, forming the short-circuit path by closing the switch and thereby making a circulation state where the current is circulated through the short-circuit path and the superconducting coil so as to prevent thermal runaway due to a hysteresis loss of the superconducting coil, to enable the superconducting coil to continue to generate the magnetic field, and to limit a decrease in the current flowing through the superconducting coil;

(D) after the power supply and the superconducting coil are disconnected from each other, in the circulation state, making current flow again to the superconducting coil from the power supply or from a new power supply as a substitute for the power supply; and (E) detecting magnitude of the current flowing through the switch by the short-circuit current detecting unit, increasing current flowing from the power supply to the superconducting coil in the (D), and opening the switch and thereby removing the short-circuit path when it is detected that the magnitude detected by the short-circuit current detecting unit becomes equal to or smaller than a set value.

2. The method for limiting a current decrease according to claim 1, comprising:
detecting magnitude of the current supplied from the power supply to the superconducting coil;
determining whether or not the detected magnitude of the current satisfies a set condition; and
when it is determined that the magnitude of the current does not satisfy the set condition, forming the short-circuit path by closing the switch at the (C) for occurrence of an abnormal state.

3. The method for limiting a current decrease according to claim 1, comprising:
detecting magnitude of a voltage between two points of the first or second current path that connect the power supply and the superconducting coil;
determining whether or not the detected magnitude of the voltage satisfies a set condition; and
when it is determined that the magnitude of the voltage does not satisfy the set condition, forming the short-circuit path by closing the switch at the (C) for occurrence of an abnormal state.

4. The method for limiting a current decrease according to claim 1, comprising:
when abnormality of the power supply is detected, forming the short-circuit path by closing the switch at the (C) for occurrence of an abnormal state.

5. A superconducting magnet device comprising:
a superconducting coil which is formed of a high-temperature superconducting wire and which generates a magnetic field when current is suppled thereto from a power supply;
a diode connected in anti-parallel with the superconducting coil;
a protector capable of forming a short-circuit path which short-circuits both first and second ends of the superconducting coil to each other wherein the protector includes a switch, a first end of the switch is connected to a halfway point of a first current path connecting the power supply to the first end of the superconducting coil to each other, a second end of the switch is connected to a halfway point of a second current path connecting the power supply to the second end of the superconducting coil, and the short-circuit path is formed by closing the switch;

a short-circuit current detecting unit which detects magnitude of current flowing through the closed switch forming the short-circuit path;

a short-circuit current comparing unit which determines whether or not the magnitude of the current detected by the short-circuit current detecting unit is equal to or smaller than a set value, when current flowing from the power supply to the superconducting coil is increased; and a removal signal output unit which outputs, to an activation device of the protector, a short-circuit removal signal for opening the switch and thereby removing the short-circuit path when a determination result of the short-circuit current comparing unit is affirmative, wherein no superconducting coils are provided between the first end of the switch and the first end of the superconducting coil, between the second end of the switch and the second end of the superconducting coil, between the first end of the switch and a first end of the diode, and between the second end of the switch and a second end of the diode, and the switch is closed, thereby forming the short-circuit and making a circulation state where the current is circulated through the short-circuit path and the superconducting coil, so as to prevent thermal runaway due to a hysteresis loss of the superconducting coil, to enable the superconducting coil to continue to generate the magnetic field, and to limit a decrease in the current flowing through the superconducting coil.

6. The superconducting magnet device according to claim 5, comprising:
a detector which outputs a short-circuit signal when detecting that the superconducting magnet device becomes in an abnormal state; and
the activation device which closes the switch so as to form the short-circuit path when the short-circuit signal is output.

7. The superconducting magnet device according to claim 6, wherein the detector includes:
a supply current detecting unit which detects magnitude of current supplied from the power supply to the superconducting coil;
a supply current comparing unit which determines whether or not the magnitude of the current detected by the supply current detecting unit satisfies a set condition; and
a short-circuit signal outputting unit which outputs the short-circuit signal for occurrence of an abnormal state, when the supply current comparing unit determines that the magnitude of current does not satisfy the set condition.

8. The superconducting magnet device according to claim 7, wherein the set condition is a condition that the detected magnitude is larger than a threshold value, or a condition that the detected magnitude falls within a set range.

9. The superconducting magnet device according to claim 6, wherein the detector includes:

a voltage detection unit which detects magnitude of a voltage between two points of first or second current path that connects the power supply and the superconducting coil;

a voltage comparison unit which determines whether or not the magnitude of the voltage detected by the voltage detection unit satisfies a set condition; and a short-circuit signal outputting unit which outputs the short-circuit signal for occurrence of an abnormal state, when the voltage comparison unit determines that the magnitude of the voltage does not satisfy the set condition.

10. The superconducting magnet device according to claim 9, wherein the set condition is a condition that the detected magnitude is larger than a threshold value, or a condition that the detected magnitude falls within a set range.

11. The superconducting magnet device according to claim 6, wherein the detector incudes:

a power abnormality detecting unit which detects an abnormality of the power supply; and a short-circuit signal outputting unit which outputs the short-circuit signal for occurrence of an abnormal state, when the power abnormality detecting unit detects an abnormality of the power supply.

12. The superconducting magnet device according to claim 6, wherein when receiving the short-circuit removal signal, or when receiving both of the short-circuit removal signal and a short-circuit removal command, the activation device opens the switch and thereby removes the short-circuit path formed by the protector.

13. The superconducting magnet device according to claim 5, wherein the power supply is a constant current source which supplies constant current to the superconducting coil, and the constant current flows through the superconducting coil in a direction from the first end to the second end of the superconducting coil.

14. The superconducting magnet device according to claim 5, comprising a plurality of magnetic field generators, each magnetic field generator including the superconducting coil and the protector, wherein the power supply is shared by the plurality of magnetic field generators, and the superconducting magnet device comprises:

a coil state detecting unit associated with each of the magnetic field generators, each respective coil state detecting unit being:

the short-circuit current detecting unit configured to detect a magnitude of current flowing through the switch, or a respective magnetic field detecting unit configured to detect a magnitude of a magnetic field generated by the respective superconducting coil;

a current supply switch provided in each of the magnetic field generators which is driven between a closed position at which current is supplied from the power supply to the magnetic field generator and an open position at which the magnetic field generator is disconnected from the power supply; and a control unit which causes the respective current supply switch in each of the magnetic field generators to be driven to the closed position when the magnitude detected by the coil state detecting unit becomes equal to or smaller than a reference value, in a state where the switch of the respective protector is closed in the respective magnetic field generator.

15. The superconducting magnet device according to claim 14, comprising:

a supply current detecting unit provided in each of the magnetic field generators which detects current supplied from the power supply to the respective magnetic field generator;

wherein each of the magnetic field generators includes the respective short-circuit current detecting unit; and wherein after causing the current supply switch of the respective magnetic field generator to be driven to the closed position, the control unit:

causes the switch of the respective protector to be driven to the open position when a current value detected by the respective short-circuit current detecting unit becomes equal to or smaller than a set value in a course of increasing of current supplied from the power supply to the respective magnetic field generator;

then causes the switch of the respective protector to be driven to the closed position when a current value detected by the respective supply current detecting unit becomes a rated current value in a course of further increasing of current supplied from the power supply to the respective magnetic field generator; and then causes the current supply switch to be driven to the open position when the current value detected by the respective supply current detecting unit becomes zero in a course of decreasing of current supplied from the power supply to the respective magnetic field generator.

* * * * *